US006964591B2

(12) United States Patent
Takada et al.

(10) Patent No.: US 6,964,591 B2
(45) Date of Patent: Nov. 15, 2005

(54) OUTBOARD MOTOR

(75) Inventors: Hideaki Takada, Wako (JP); Hiroshi Mizuguchi, Wako (JP); Taiichi Otobe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/762,528

(22) Filed: Jan. 23, 2004

(65) Prior Publication Data

US 2004/0152375 A1 Aug. 5, 2004

(30) Foreign Application Priority Data

Jan. 28, 2003 (JP) ............................ 2003-019236
Jan. 28, 2003 (JP) ............................ 2003-019237

(51) Int. Cl.[7] ............................ B60K 41/00
(52) U.S. Cl. ............................ 440/86; 440/87
(58) Field of Search ............................ 440/84, 86, 87

(56) References Cited

U.S. PATENT DOCUMENTS 3,121,415 A * 2/1964 Anderson et al. ............. 440/59
4,810,216 A * 3/1989 Kawamura ..................... 440/2
4,946,411 A * 8/1990 Novey ......................... 440/84
6,406,342 B1 * 6/2002 Walczak et al. .............. 440/84

FOREIGN PATENT DOCUMENTS

JP 03-000589 1/1991
JP 10-184402 7/1998

* cited by examiner

*Primary Examiner*—Jesus D. Sotelo
(74) *Attorney, Agent, or Firm*—Westerman, Hattori, Daniels & Adrian, LLP

(57) ABSTRACT

In outboard motor mounted on a stern of a boat and equipped with an internal combustion engine at its upper portion and a propeller at its lower portion that is powered by the engine to propel the boat, having a throttle actuator moving a throttle valve installed at an air intake pipe of the engine for regulating an amount of air to be sucked into the engine to change a boat running speed, a shift actuator rotating a shift rod connected to a clutch such that the clutch moves from a neutral position to engage with at least one of a forward gear and a reverse gear, a steering actuator rotating a swivel shaft installed in the outboard motor such that the outboard motor is steered relative to the boat, a group of devices (i.e., a steering grip, a shift/throttle lever, etc.) is installed at a position other than the boat and each operable by an operator to generate a signal indicating that the operator's instruction to operate at least one of the actuators is inputted. The group of devices is installed on a control panel that is installed at the stern brackets that connect the outboard motor to the boat, or is installed at a bar handle fastened to the stern brackets.

14 Claims, 21 Drawing Sheets

OUTBOARD MOTOR

BACKGROUND OF THE INVENTION

1. Field of the Invention

This invention relates to an outboard motor.

2. Description of the Related Art

In a simple type of outboard motors, a bar handle (tiller handle) is fixed to the outboard motor in such a way that the operator manually moves the bar handle to turn the outboard motor such that the boat (hull) is steered in a desired direction. In this type of outboard motors, the bar handle is usually provided with levers which are mechanically connected, via push-pull cables or link mechanisms, to a shift rod that changes the position of clutch and to a throttle valve of an internal combustion engine that changes the throttle opening. With this, the operator changes gear to shift and changes the boat running speed by manipulating corresponding one of levers, while steering the boat by the bar handle.

However, when all of the levers must be operated manually, since the operator tends to have an unpleasant operation "feel" owing to, for instance, heavy load, it has been proposed installing actuators at the outboard motor, while installing devices operable by the operator at the boat and connecting them with the actuators through cables, etc., to power-assist shift and boat running speed regulation, as taught in Japanese Laid-Open Patent Application Nos. Hei 10 (1998)—184402 and Hei 3 (1991)—000589.

Nevertheless, this add-on system has still disadvantages, most notably, that it takes up a space for the devices at the boat, that it needs work for installing their cables on the boat and that, its structure is complicated and it adds to the number and weight of the components.

SUMMARY OF THE INVENTION

An object of the present invention is therefore to overcome the foregoing issues by providing an outboard motor that improves operation feel, while avoiding a problem regarding space utilization and work, and preventing increase in number of components and weight.

In order to achieve the first and second objects, this invention provides, an outboard motor mounted on a stern of a boat and having an internal combustion engine at its upper portion and a propeller at its lower portion that is powered by the engine to propel the boat, comprising: a throttle actuator moving a throttle valve installed at an air intake pipe of the engine for regulating an amount of air to be sucked into the engine to change a boat moving speed; a shift actuator rotating a shift rod connected to a clutch such that clutch moves from a neutral position to engage with at least one of a forward gear that allows the boat to be propelled in a forward direction and a reverse gear that allows the boat to be propelled in a reverse direction opposite to the forward direction; a steering actuator rotating a swivel shaft installed in the outboard motor such that the outboard motor is steered relative to the boat; a group of devices installed at a position other than the boat and each operable by an operator to generate a signal indicating that an instruction of the operator to operate at least one of the actuators is inputted; and a controller controlling operation of at least one of the actuators in response to the generated signal.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

An outboard motor according to embodiments of the invention will now be explained with reference to the attached drawings.

Figure 1:
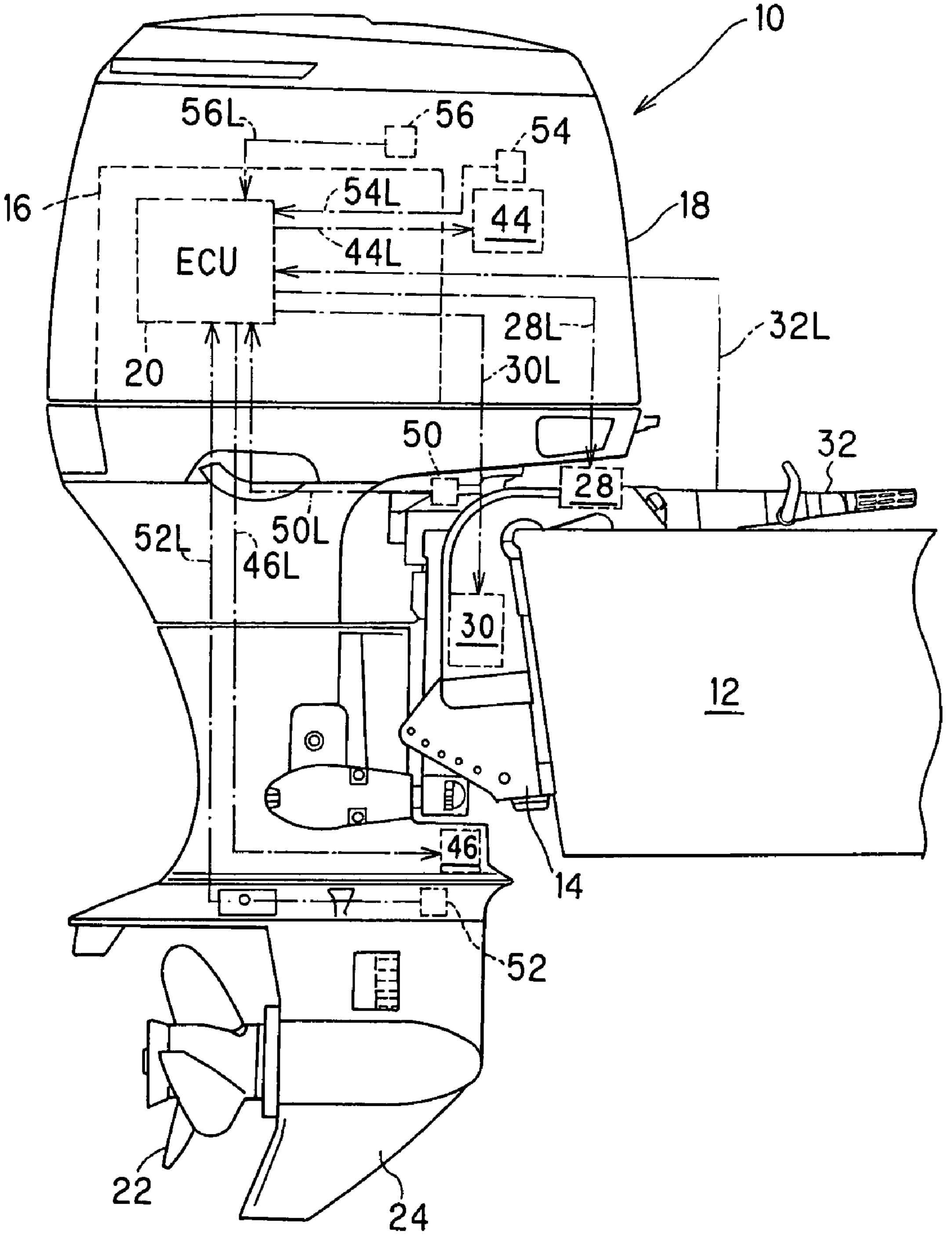
FIG. 1 is an overall schematic side view of an outboard motor according to an embodiment of the invention.

FIG. 1 is an overall side view of an outboard motor according to a first embodiment of the invention.

Reference numeral 10 in FIG. 1 designates an outboard motor built integrally of an internal combustion engine, propeller shaft, propeller and other components. As illustrated in the figure, the outboard motor 10 is mounted on the stern of a boat (hull) 12 via stern brackets 14 to be rotatable about the vertical and horizontal axes.

The outboard motor 10 is equipped with an internal combustion engine 16 at its upper portion. The engine 16 is a spark-ignition, in-line four-cylinder gasoline engine with a displacement of 2,200 cc. The engine 16, located inside the outboard motor 10, is enclosed by an engine cover 18 and positioned above the water surface. An electronic control unit (ECU) 20 constituted of a microcomputer is installed near the engine 16 enclosed by the engine cover 18.

The outboard motor 10 is equipped at its lower part with a propeller 22 and a rudder 24 adjacent thereto. The rudder 24 is fixed near the propeller 22 and does not rotate independently. The propeller 22, which operates to propel the boat 12 in the forward and reverse directions, is powered by the engine 16 through a crankshaft, drive shaft, gear mechanism and shift mechanism (none of which is shown).

Near the stern brackets 14, there are installed a steering actuator, i.e., an electric motor (for steer) 28, and a conventional power-tilt-trim unit 30 to regulate the tilt angle and trim angle of the outboard motor 10, that are connected to the ECU 20 through signal lines 28L and 30L.

A bar handle (tiller handle) 32 is fastened to the brackets 14 at an end closer to the boat 12 in such a manner that a distal end of the bar handle extends towards the boat 12. A group of devices (explained later) is installed at the bar handle 32 to be used for the operator to input various instructions. As will be explained later in detail, the devices are a steering grip to be used for inputting the operator's instruction to steer, a shift/throttle lever to be used for inputting the operator's instructions to shift (change gear) and to increase/decrease boat running speed and a power-tilt-trim switch to be used for inputting the operator's instruction to regulate the tilt or trim angle of the outboard motor 10. The group of devices is connected to the ECU 20 through a signal line 32L. Thus, the group of devices is installed at a position other than the boat 12.

Adjacent to the air intake pipe (not shown) of the engine 16, an electric motor 44 (for opening/closing the throttle valve; not shown in FIG. 1) to regulate (increase/decrease) the engine speed of the engine 16 (i.e., the boat running speed) is installed and is connected to the ECU 20 through a signal line 44L. Another electric motor 46 (for shift) is installed at a lower position of the outboard motor 10 to rotate a shift rod (not shown) to effect shift and is connected to the ECU 20 through the signal line 46L.

A rotation angle sensor 50 is mounted at a position near a swivel shift (not shown) and outputs a signal indicative of the rotation angle of the swivel shaft. Another rotation angle sensor 52 is mounted at a position near the shift rod and outputs a signal indicative of the rotation angle of the shift rod. Further, a throttle position sensor 54 is installed at a position near the throttle valve and outputs a signal indicative of the position of the throttle valve (i.e., the opening of the throttle valve) and a crank shaft angle sensor 56 is installed at a position near the crankshaft and outputs a signal indicative of the engine speed (i.e., boat running speed).

The outputs of these sensors are sent to the ECU 20 over signal line 50L, 52L, 54L and 56L. In response to the outputs of these sensors and the devices installed at the bar handle 32, the ECU 20 operates the electric motor 28 (for steer) to steer the outboard motor 10, and operates the power-tilt-trim unit 30 to regulate the tilt angle and trim angle of the outboard motor 10. It also operates the electric motor 44 to regulate the engine speed (boat running speed) and operates the electric motor 46 to conduct the shift (i.e., to change the rotational direction of the propeller 22 or cut off the transmission of engine power to the propeller 22).

Figure 2:
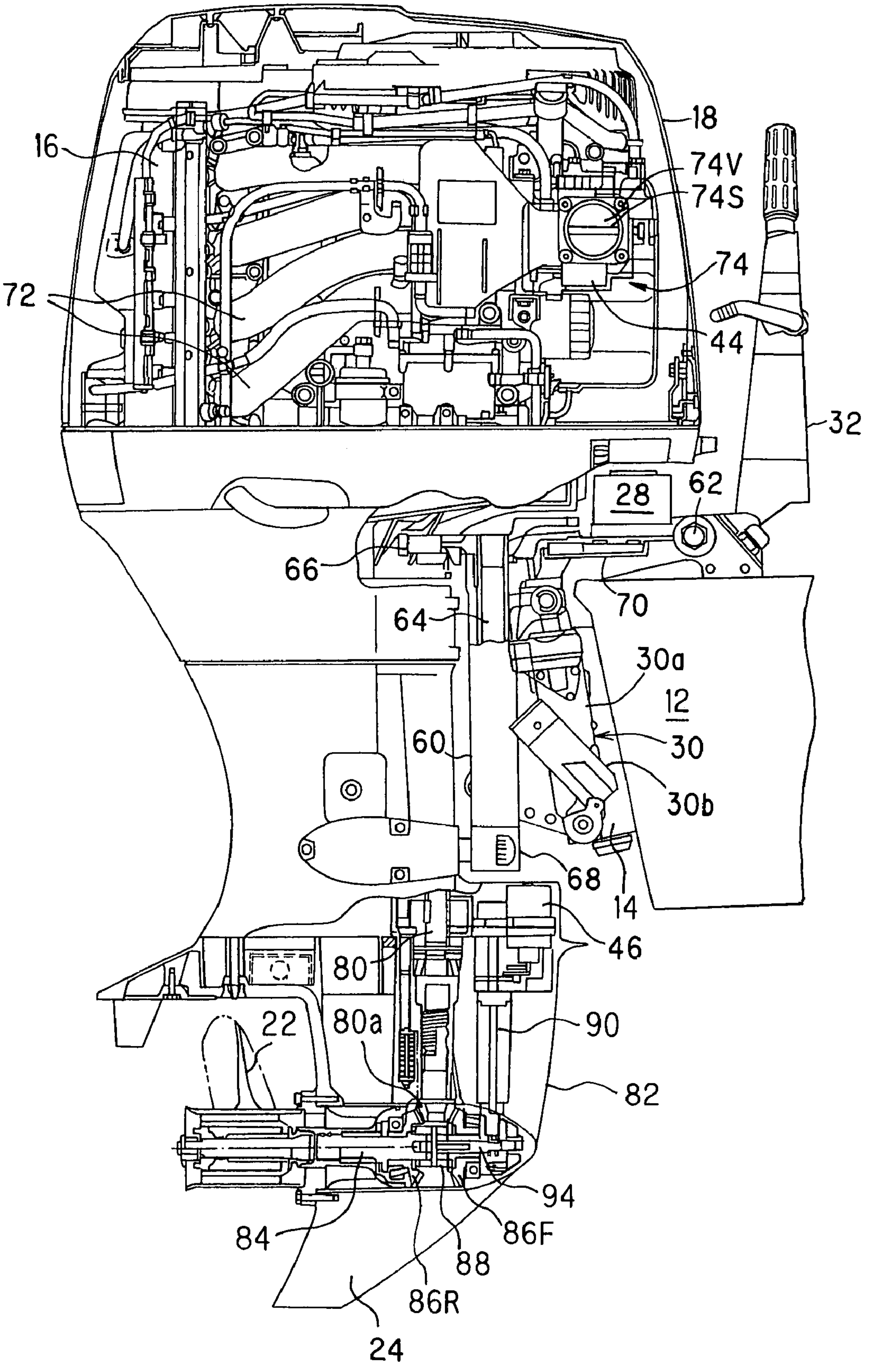
FIG. 2 is an enlarged (partially cross-sectional) side view of the outboard motor illustrated in FIG. 1.

FIG. 2 is an enlarged (partially cross-sectional) side view of FIG. 1, wherein the bar handle 32 is shown as bent upwards.

As illustrated in FIG. 2, the power-tilt-trim unit 30 is equipped with one hydraulic cylinder **30*a* for tilt angle regulation and, constituted integrally therewith, two hydraulic cylinders 30*b* for trim angle regulation (only one shown). One end (cylinder bottom) of the tilt hydraulic cylinder 30*a* is fastened to the stern brackets 14 and through it to the boat 12 and the other end (piston rod head) thereof abuts on a swivel case (now assigned with reference numeral 60). One end (cylinder bottom) of each trim hydraulic cylinder 30*b* is fastened to the stern brackets 14 and through it to the boat 12, similarly to the one end of the tilt hydraulic cylinder 30*a*, and the other end (piston rod head) thereof abuts on the swivel case 60**.

The swivel case 60 is connected to the stern brackets 14 through a tilting shaft 62 to be relatively displaceable about the tilting shaft 62. In other words, the swivel case 60 is connected to the boat 12 to be displaceable to each other about the tilting shaft 62. The swivel shaft (now assigned with reference numeral 64) is accommodated inside the swivel case 60 to be rotatable about the vertical axis. The swivel shaft 64 extends in the vertical direction and has its upper end fastened to a mount frame 66 and its lower end fastened to a lower mount center housing 68. The mount frame 66 and lower mount center housing 68 are fastened to a frame on which the engine 16 and the propeller 22, etc., are mounted.

The electric motor 28 (for steer) and a gearbox (gear mechanism) 70 for reducing the rotational speed of the electric motor 28 are fastened to an upper portion above the swivel case 60. The gearbox 70 is connected, at its input side, to the output shaft of the electric motor 28 and is connected, at its output side, to the mount frame 66. Horizontal steering of the outboard motor 10 is thus power-assisted using the rotational output of the electric motor 28 to swivel the mount frame 66 and the swivel shaft 64 and thus turns the propeller 22 and rudder 24 about the vertical axis. The overall rudder turning angle (steerable angle) of the outboard motor 10 is 60 degrees, 30 degrees to the right and 30 degrees to the left.

The engine 16 has an intake manifold connected 72 to the air intake pipe (not shown) and a throttle body 74. The aforesaid electric motor 44 is integrally attached to the throttle body 74 and is connected to a throttle shaft 74S that carries the throttle valve (now assigned with reference numeral 74V) via a gear mechanism (not shown) installed adjacent to the throttle body 74. The output of the engine 16 is transmitted, via the crankshaft (not shown) and a drive shaft 80, to a propeller shaft 84 accommodated in a gear case 82, and rotates the propeller 22 that is fixed to the propeller shaft 84. The rudder 24 is integrally formed with the gear case 82.

A forward gear 86F and a reverse gear 86R are provided around the propeller shaft 84, respective of which meshes with a drive gear **80*a* fixed to the bottom end of the drive shaft 80 and are rotated in opposite directions. A clutch 88 is provided at a position between the forward gear 86F and the reverse gear 86R to be rotated integrally with the propeller shaft 84. With the movement of a shift rod 90 rotated by the electric motor 46 and the motion of a shift slider 94 in response thereto, the clutch 88 is brought into engagement with the forward gear 86F or the reverse gear 86**R to effect the shift, or is held at the neutral position.

Figure 3:
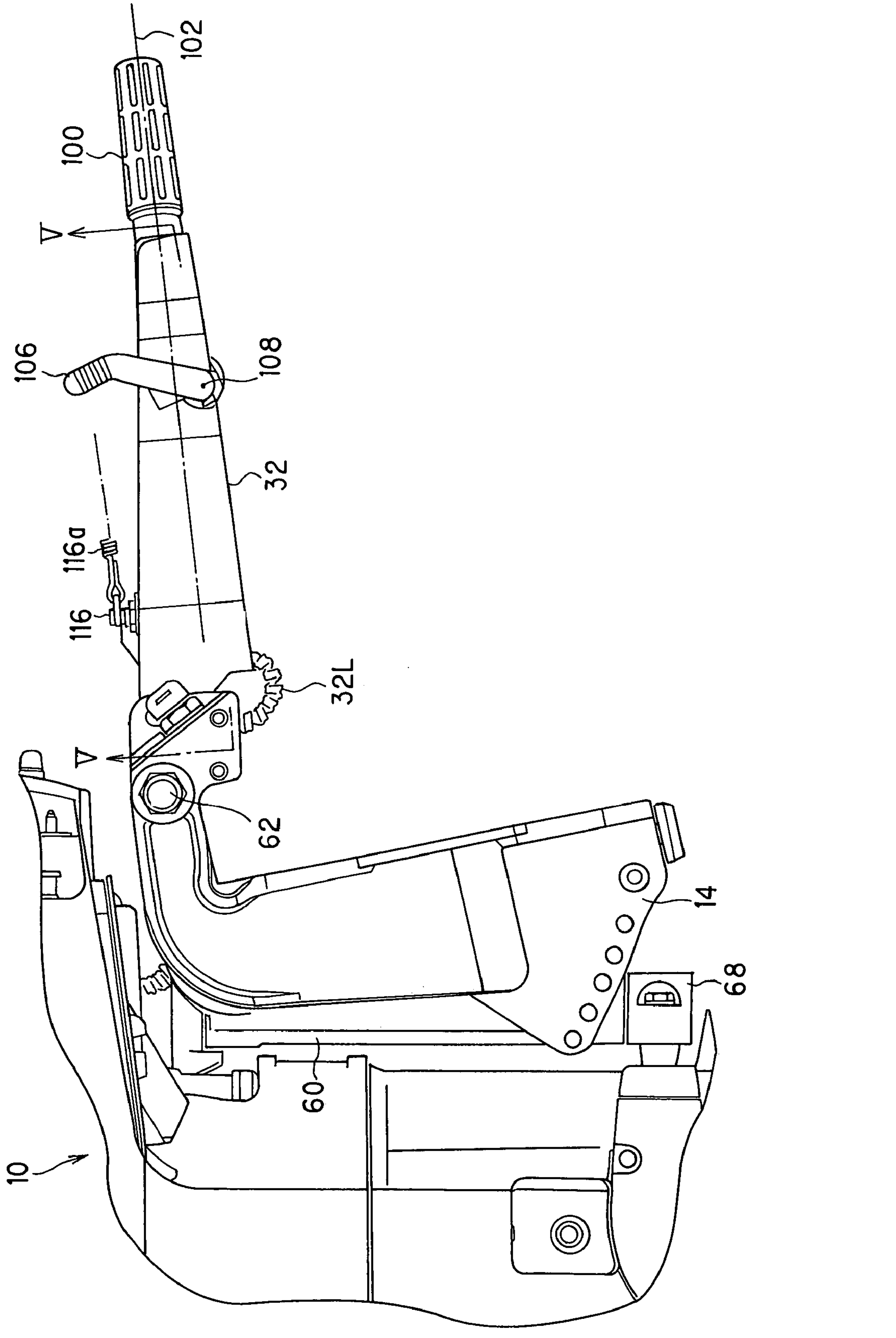
FIG. 3 is an enlarged side view of portions around stern brackets and a bar handle illustrated in FIG. 1.
Figure 4:
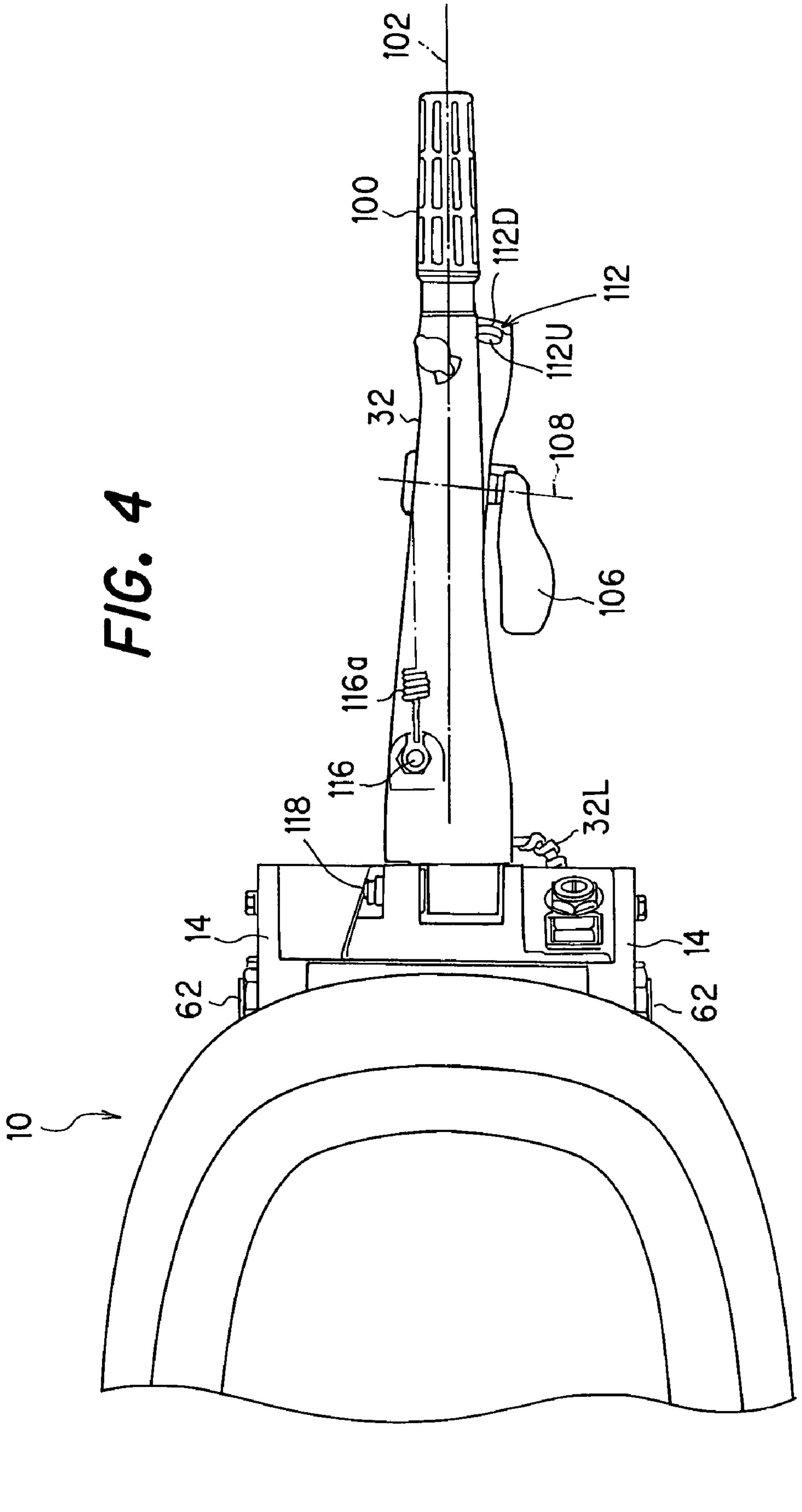
FIG. 4 is an enlarged plan view of the portions illustrated in FIG. 3.
Figure 5:
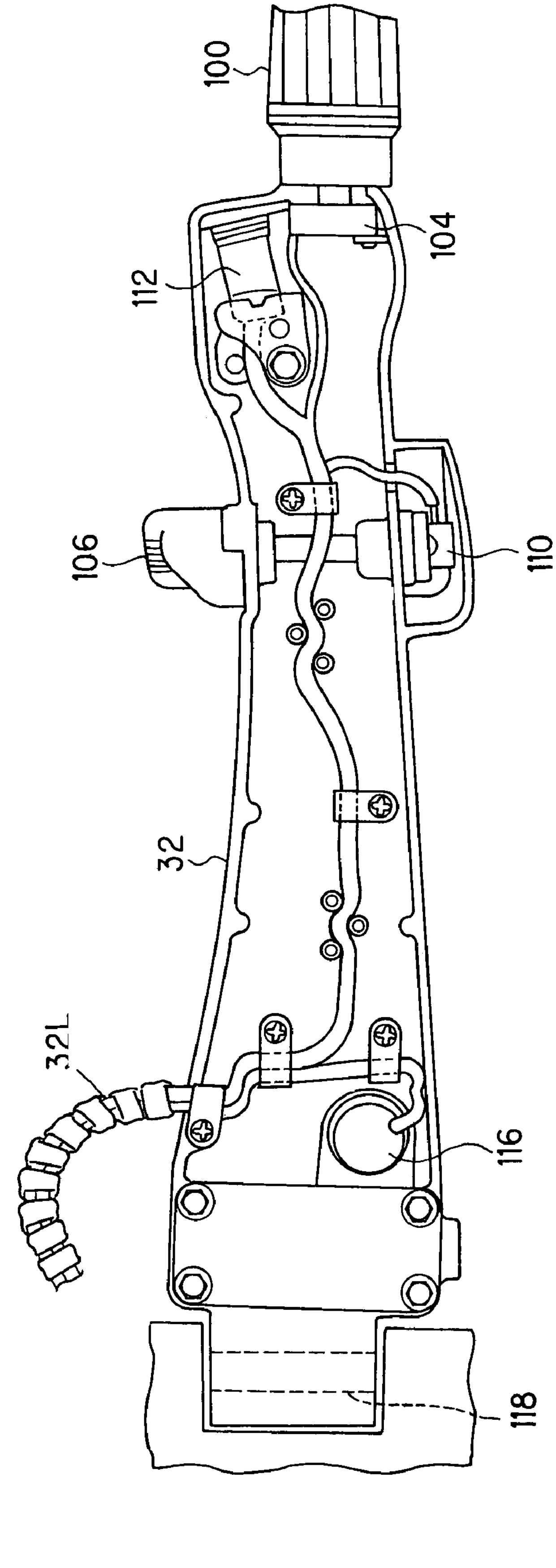
FIG. 5 is a cross-sectional view taken along the line V—V of FIG. 3.

The group of devices installed at the bar handle 32 will then be explained with reference to FIGS. 3 to 5, in which FIG. 3 is an enlarged side view of a portion around the stern brackets 14 and the bar handle 32 illustrated in FIG. 1; FIG. 4 is a plan view of the portion illustrated in FIG. 3; and FIG. 5 is an enlarged cross-sectional view taken along the line V—V of FIG. 3. In FIGS. 3 and 4, the electric motor 28 is omitted from illustration.

As shown in FIGS. 3 and 4, the aforesaid steering grip (now assigned with reference numeral 100) is installed, as one of the devices, at its distal end close to the boat 12. The steering grip 100 is formed to fit the operator's hand and is made rotatable about its axial direction (longitudinal direction) 102 of the bar handle 32. When rotated, it generates a signal indicating that the operator's instruction to steer, i.e., to operate the electric motor 28 is inputted. Specifically, when the grip 100 is rotated clockwise by the operator, the angle of rotation in that direction is detected by the ECU 20 through the output of a rotation angle sensor 104 (shown in FIG. 5) sent over the signal line 32L. As a result, the ECU 20 operates the electric motor 28 based on the sensor output to turn the swivel shaft 64 and the mount frame 66 relative to the boat 12 so as to turn the outboard motor 10 about the vertical axis in a direction such that the boat 12 is steered, for example, right.

On the other hand, when the grip 100 is rotated counter clockwise, the ECU 20 operates the electric motor to turn the outboard motor 10 in the opposite direction such that the boat is steered left, for example. As will be understood from the above, since the bar handle 32 is fixed to the stern brackets 14, the bar handle 32 does not move. With this, the operator steers the boat 12 right or left using the steering grip 100 on the bar handle 32 with a same posture or attitude. This can further improve the operation feel.

Figure 6:
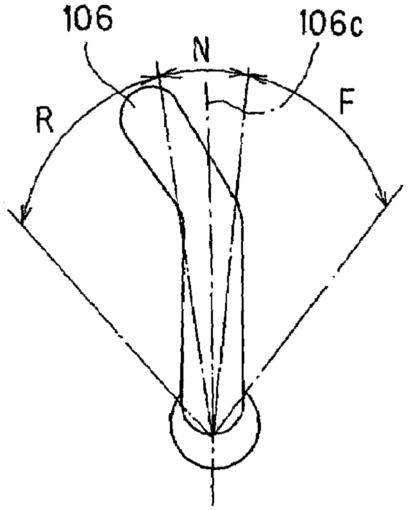
FIG. 6 is an enlarged explanatory view of a shift/throttle lever illustrated in FIG. 3.

The aforesaid shift/throttle lever (now assigned with reference numeral 106) is installed at a position midway of the handle bar 32. The shift/throttle lever 106 is similarly formed to fit the operator's hand and is made rotatable about an axis 108 that intersects the axial direction 102 of the bar handle 32 at a right angle and when rotated, it generates a signal indicating that the operator's instructions to shift (change gear) and to increase/decrease boat running speed, i.e., to operate the electric motors 44 and 46 is inputted. The angle of rotation is detected by the ECU 20 through the output of a rotation angle sensor 110 (shown in FIG. 5) sent over the signal line 32L. As is shown in FIG. 6, depending on the magnitude and direction of rotation, the angular range of rotation of the shift/throttle lever 106 is divided into a reverse range designated by R, a neutral range designated by N and a forward range designated by F.

Specifically, if the lever 106 (more precisely its axis 106*c*) is moved to the forward region F by the operator when the shift position (gear position) is neutral, the ECU 20 operates the electric motor 46 such that the clutch 88 engages with the forward gear 86F and at the same time, it operates the electric motor 44 such that the throttle opening is increased as increasing angle of rotation of the lever 106 so as to increase the engine speed (i.e. boat running speed).

On the other hand, if the lever 106 is moved to the reverse region R by the operator when the shift position is neutral, the ECU 20 operates the electric motor 46 such that the clutch 88 engages with the reverse gear 86R and at the same time, it operates the electric motor 44 in a similar manner such that the throttle opening is increased as increasing angle of rotation of the lever 106 so as to increase the engine speed (i.e. boat running speed).

Alternatively, if the lever 106 is moved to the neutral region N by the operator when the shift position is forward, the ECU 20 operates the electric motor 44 such that the throttle opening is decreased to a low speed around the idling speed and then, it operates the electric motor 46 such that the clutch 88 disengages from the forward gear 86F. If the lever 106 is moved to the neutral region N by the operator when the shift position is reverse, the ECU 20 operates the electric motor 44 in a similar manner such that the throttle opening is decreased to a low speed around the idling speed and then, it operates the electric motor 46 such that the clutch 88 disengages from the reverse gear 86R.

Figure 7:
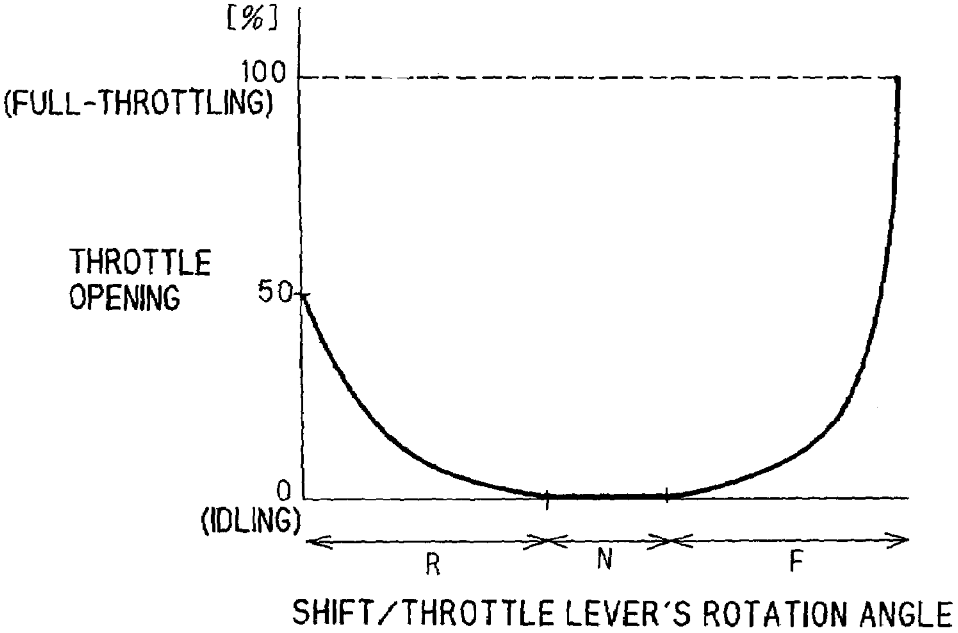
FIG. 7 is a graph showing the relationship between the angle of rotation of the shift/throttle lever illustrated in FIG. 3 and the opening of a throttle valve installed at an air intake pipe of an internal combustion engine illustrated in FIG. 2.

As shown in FIG. 7, the relationship between the angle of rotation of the lever 106 and the throttle opening is set such that, the throttle opening is increased as the angle of rotation of the lever 106 is farther from the neutral range N, in other words, as the magnitude of movement of the lever 106 is increased, regardless of the direction of movement of the lever 106. With this, it ensures a fine throttle control at a low boat running speed to reach to a desired boat running speed easily, while enhancing response to the operator's demand to accelerate or decelerate at a high boat running speed. Further, since the maximum throttle opening at reverse running is set to be smaller than that at forward running, more precisely, is set to be almost half of that at forward running, this can prevent the speed from becoming excessive at reverse running and improve running stability.

Returning to the explanation of the devices with reference to FIGS. 3 and 4, the aforesaid power-tilt-trim switch (now assigned with reference numeral 112) is installed (as one of the devices) at a position near the steering grip 100 to be used for inputting the operator's instruction to regulate the tilt or trim angle of the outboard motor 10, i.e., the operator's instruction to operate the power-tilt-trim unit 30. Specifically, the power-tilt-trim switch 112 comprises two switches, i.e., an up-switch 112U that generates a signal indicating that the instruction to tilt the outboard motor 10 up is inputted when made on and a down-switch 112D that generates a signal indicating that the instruction to tilt it down is inputted. The up-switch 112U or the down-switch 112D generates a corresponding signal that is sent to the ECU 20 over the signal line 32L.

When the switch 112U is made on by the operator, the ECU 20 operates the two trim hydraulic cylinders 30*b* to extend so as to increase the trim angle such that the boat 12 raises its stem. On the contrary, when the down-switch 112D is made on by the operator, the ECU 20 operates the two trim hydraulic cylinders 30*b* to contract so as to decrease the trim angle such that the boat 12 drops the stem.

If the up-switch 112U is made on when the two trim hydraulic cylinders 30*b* are extended to its maximum, the ECU 20 operates the tilt hydraulic cylinder 30*a* to extend such that the propeller 22 is lifted above the water surface. If the down-switch 112D is made on when the propeller 22 is lifted above the water surface, the ECU 20 operates the tilt hydraulic cylinder 30*a* to contract such that the propeller 22 is lowered under the water surface.

Continuing the explanation of the bar handle 32, as shown in FIGS. 3 and 4, an emergency switch 116 is installed at a position close to the end of the bar handle 32 at which the bar handle 32 is fixed to the stern brackets 14. The emergency switch has a cord or strap 116*a* that is to be worn around the operator's wrist. If the operator should drop off the boat, the cord 116*a* is pulled out of the emergency switch 116, and the emergency switch 116 generates an alert signal.

The generated signal is sent to the ECU 20 over the signal line 32L. When this happens, the ECU 20 operates the electric motor 44 to fully close the throttle valve 74V to drop the engine speed to idling such that the boat 12 almost stops, or operates the electric motor 28 such that the boat 12 turns back.

As illustrated in FIGS. 4 and 5, the bar handle 32 is fastened to the stern brackets 14 through a pivot shaft 118 in such a way that the bar handle 32 can be bent upwards if desired.

Having been arranged in the foregoing manner, in the outboard motor according to this embodiment, since the actuators (electric motors) 28, 44 and 46 are provided to power-assist in moving or driving the swivel shaft 64 for steering, the shift rod 90 for shifting, and the throttle valve 74V for regulating boat running speed, this can mitigate the loads to the operator and can improve the operation feel.

Further, since the group of devices (i.e., the steering grips 100, etc.) to be used for inputting the operator's instruction to operate the actuators is installed at a position other than the boat 12, more specifically, are installed at the bar handle 32 fixed to the stern brackets 14 which connect the outboard motor 10 to the boat 12, this does not take up a space for the devices at the boat, and this needs no work for installing their cables for on the boat, thereby enabling to avoid the problem regarding space utilization and work and to prevent increase in number of components and weight.

Further, since the group of devices is installed on the bar handle 32 at a position close to the boat 12, this can further improve the operation feel. And, since the bar handle 32 is fixed to the stern brackets 14 and does not move, the operator steers the boat 12 right or left using the steering grip 100 on the bar handle 32 with a same posture or attitude. This can further improve the operation feel.

Moreover, since the relationship between the angle of rotation of the shift/throttle lever 106 and the throttle opening is set such that the throttle opening is increased as the magnitude of movement of the lever 106 is increased, it becomes possible to ensure a fine throttle control at a low boat running speed to reach to a desired boat running speed easily, while enhancing response to the operator's demand to accelerate or decelerate at a high boat running speed. In addition, since the maximum throttle opening at reverse running is set to be smaller than that at forward running, it becomes possible to prevent the speed from becoming excessive at reverse running and improve running stability.

Figure 8:
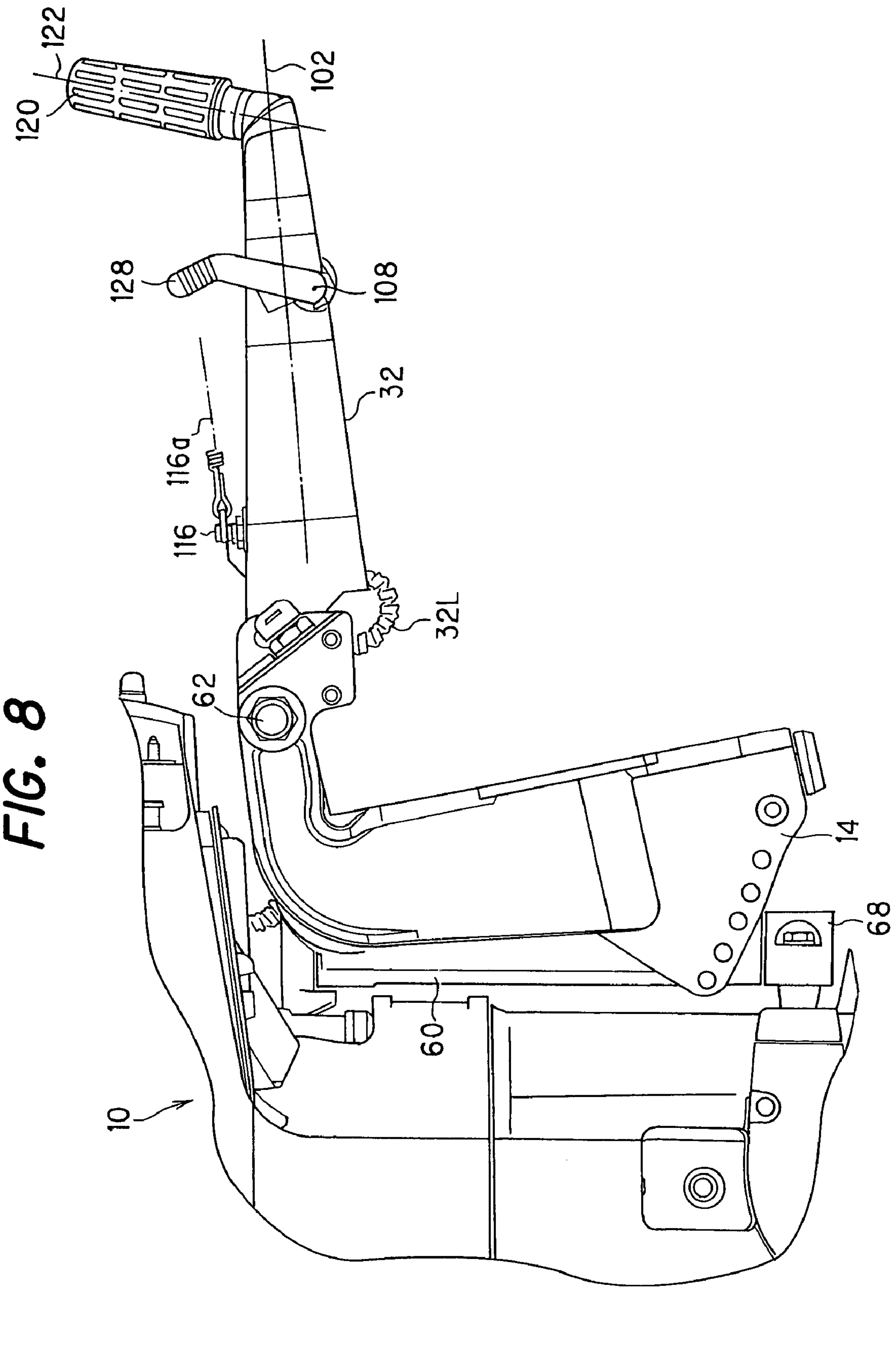
FIG. 8 is a view, similar to FIG. 3, but showing an outboard motor according to a second embodiment of the invention.
Figure 9:
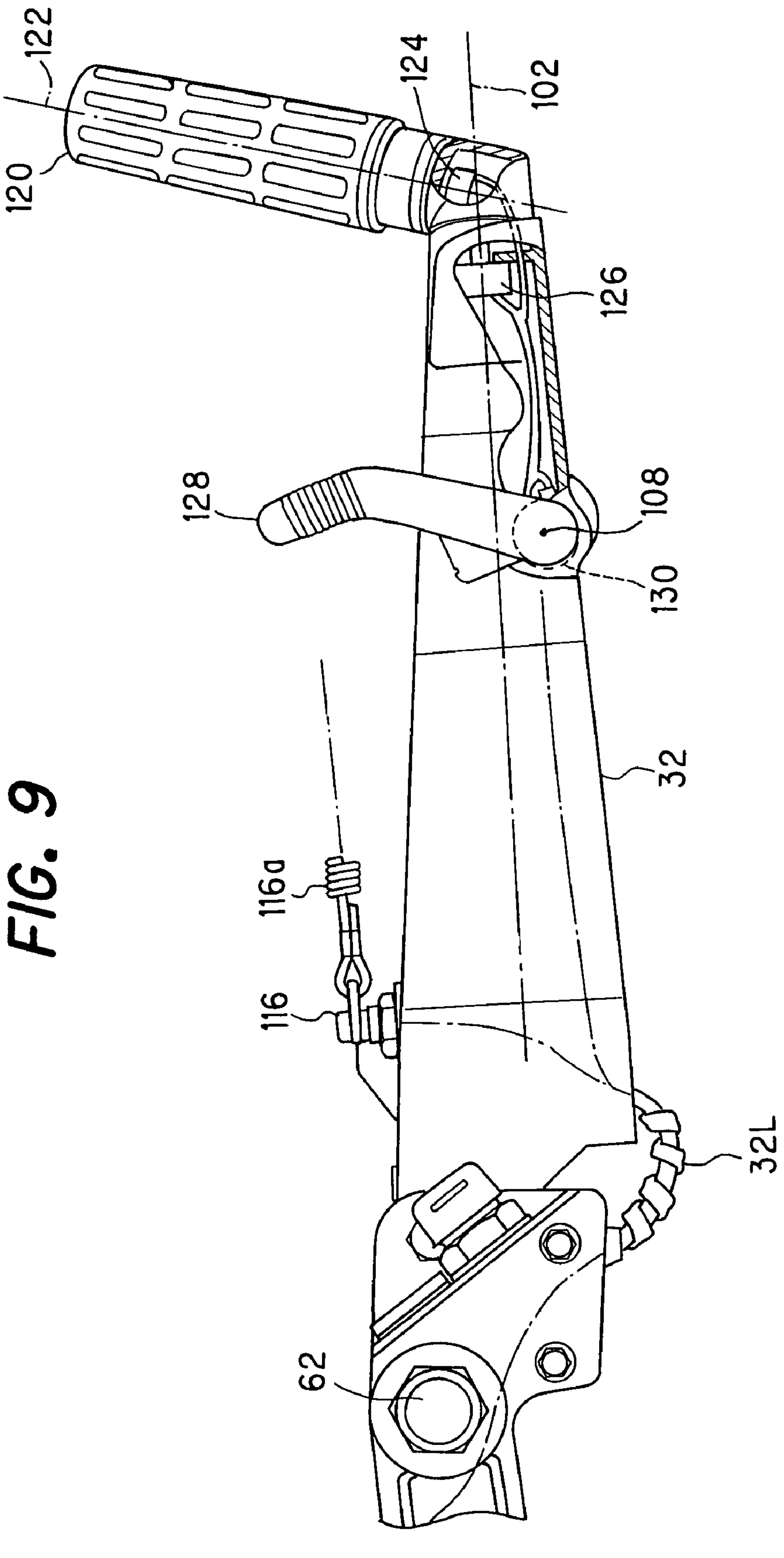
FIG. 9 is an enlarged (partially cross-sectional) view of the bar handle illustrated in FIG. 8.

Next, an outboard motor according to a second embodiment of the invention will be explained with reference to FIGS. 8 to 10, wherein FIG. 8 is a view, similar to FIG. 3, and shows the portion around the stern brackets 14 and the bar handle 32; FIG. 9 is an enlarged cross-sectional view of the bar handle 32 shown in FIG. 8; and FIG. 10 is an enlarged explanatory front view of a throttle grip illustrated in FIG. 8 and viewed from the boat 12.

As illustrated in the figures, in the outboard motor according to the second embodiment, the distal end of the bar handle 32 is raised vertically at an almost right angle to form a throttle grip 120 at that position. The throttle grip 120 is made movable right or left about the axial direction 102 of the bar handle 32, as illustrated in FIG. 10, and is also made rotatable about its axial direction (longitudinal direction) 122.

Specifically, when the throttle grip 120 is manually rotated about the axial direction 120 by the operator, it generates a signal indicating that the operator's instruction to increase/decrease boat running speed, i.e., to operate the electric motor 44 is inputted. The angle of rotation is detected by the ECU 20 through the output of a rotation angle sensor 124 (shown in FIG. 9) sent over the signal line 32L. The ECU 20 operates the electric motor 44 based on the detected angle of rotation to regulate the engine speed (i.e. boat running speed).

Figure 10:
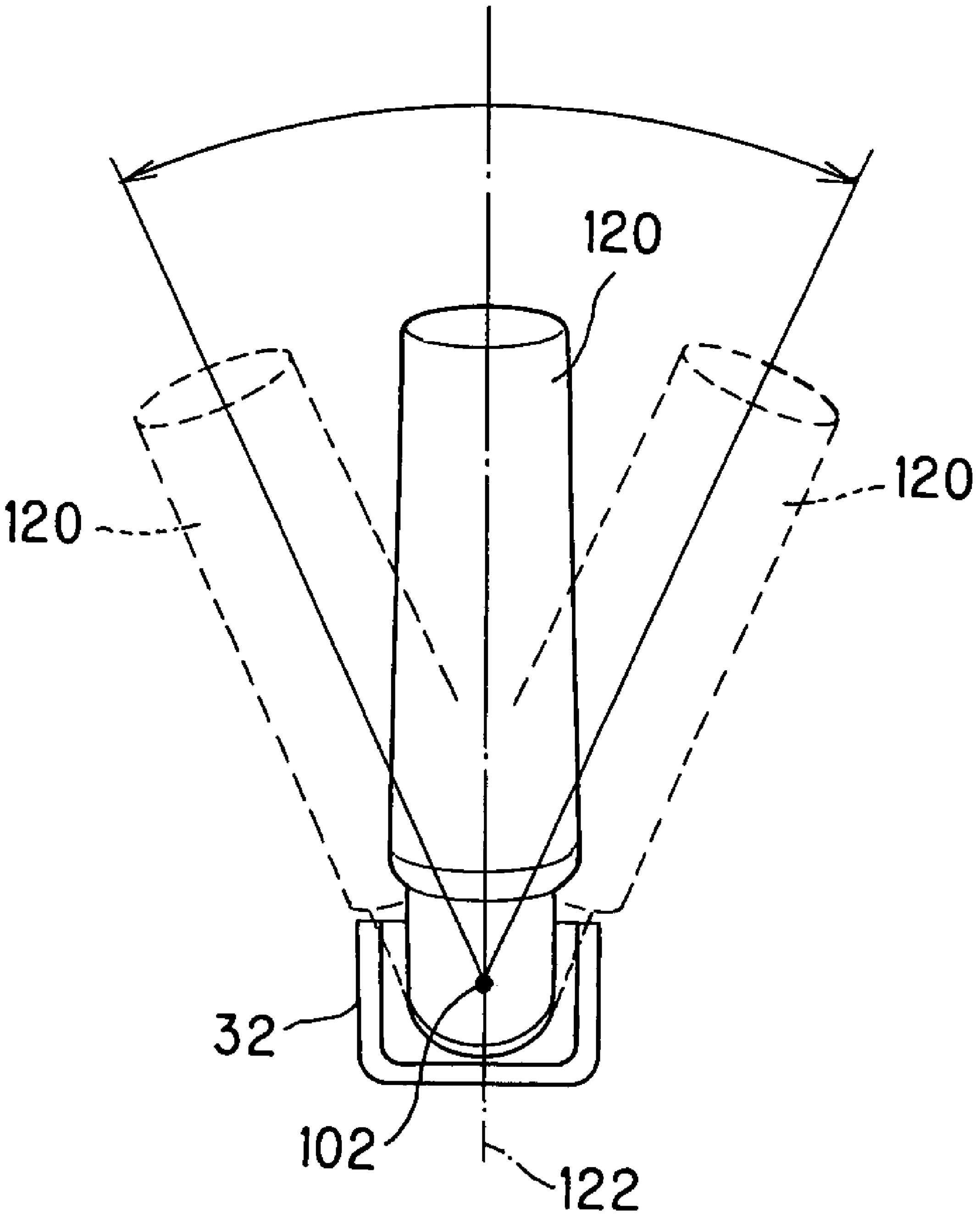
FIG. 10 is an enlarged explanatory front view of a steering grip, viewed from the boat, illustrated in FIG. 8.

As illustrated in FIG. 10, the throttle grip 120 is also made movable or turnable right or left about the axial direction 102 of the bar handle 32 and when moved, it generates a signal indicating that the operator's instruction to steer, i.e., to operate the electric motor 28 is inputted. Specifically, when the grip 120 is rotated clockwise by the operator, the angle of rotation in that direction is detected by the ECU 20 through the output of a rotation angle sensor 126 (shown in FIG. 9; similar to the rotation angle sensor 104) sent over the signal line 32L. The ECU 20 operates the electric motor 28 based on the sensor output to turn the outboard motor 10 such that the boat 12 is steered, for example, right. On the other hand, when the grip 120 is rotated counter clockwise, the ECU 20 operates the electric motor to turn the outboard motor 10 in the opposite direction such that the boat is steered left, for example.

As illustrated in FIGS. 8 and 9, a shift lever 128 is installed at a position midway of the bar handle 32. The shift lever 128 is similar to the shift/throttle lever 106 in the first embodiment and is made rotatable about an axial direction 108 (that intersects the axial direction 102 at an almost right angle) over a predetermined angular range of rotation. When rotated, it generates a signal indicating that the operator's instructions to shift (change gear), i.e., to operate the electric motors 46 is inputted. The angle of rotation is detected by the ECU 20 through the output of a rotation angle sensor 130 (shown in FIG. 9; similar to the rotation angle sensor 110 in the first embodiment) sent over the signal line 32L. Similar to the shift/throttle lever in the first embodiment, the angular range of rotation of the shift lever 128 is divided into a reverse range, a neutral range and a forward range. The ECU 20 operates the the electric motor 46 based on the output of the rotation angle sensor 130 such that a desired shift (gear change) is achieved.

The rest of the configuration of the second embodiment is not different from that of the first embodiment.

Having been configured in the foregoing manner, the outboard motor according to the second embodiment has the same advantages and effects as those mentioned in the first embodiment.

Figure 11:
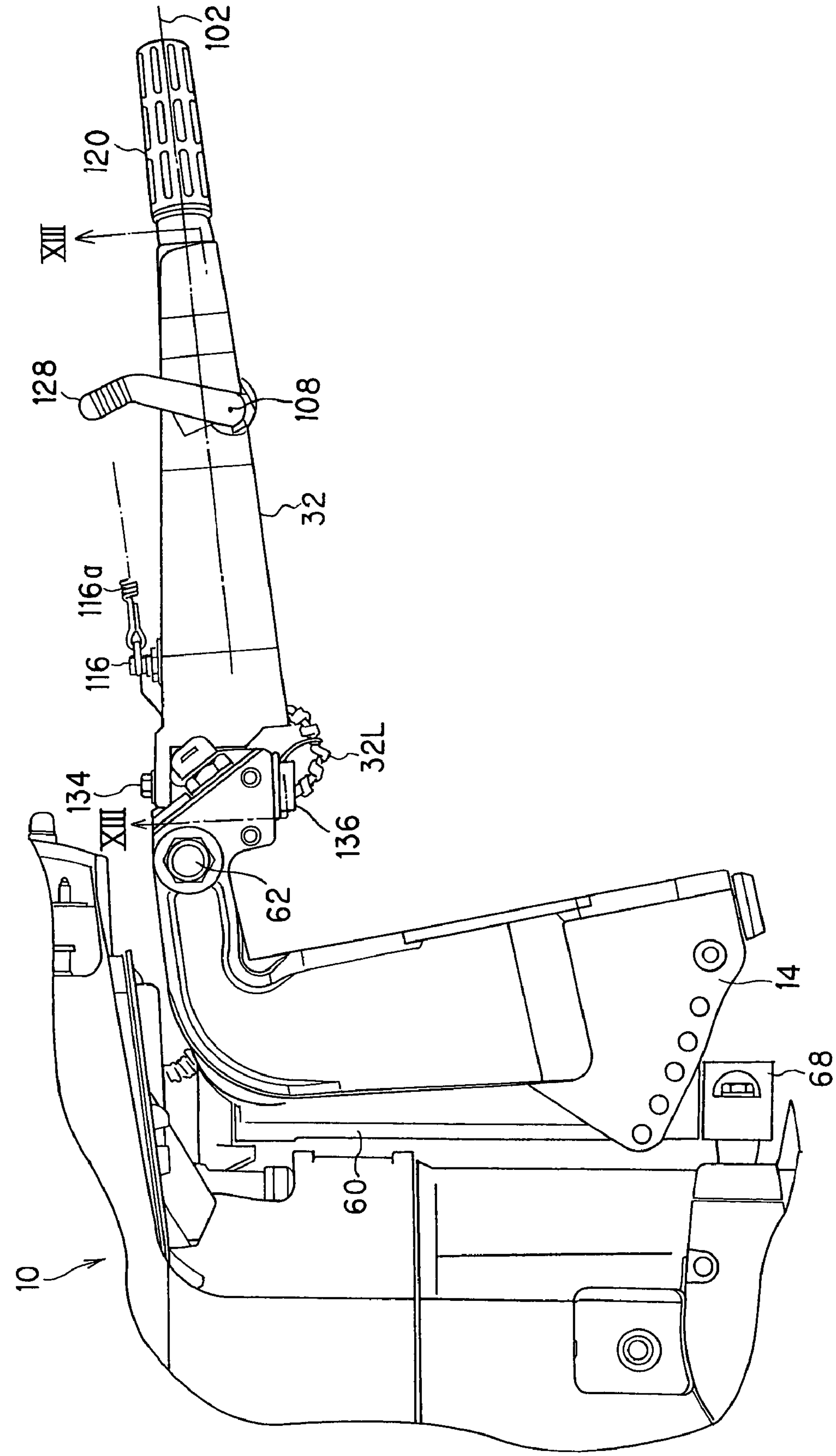
FIG. 11 is a view, similar to FIG. 3, but showing an outboard motor according to a third embodiment of the invention.
Figure 12:
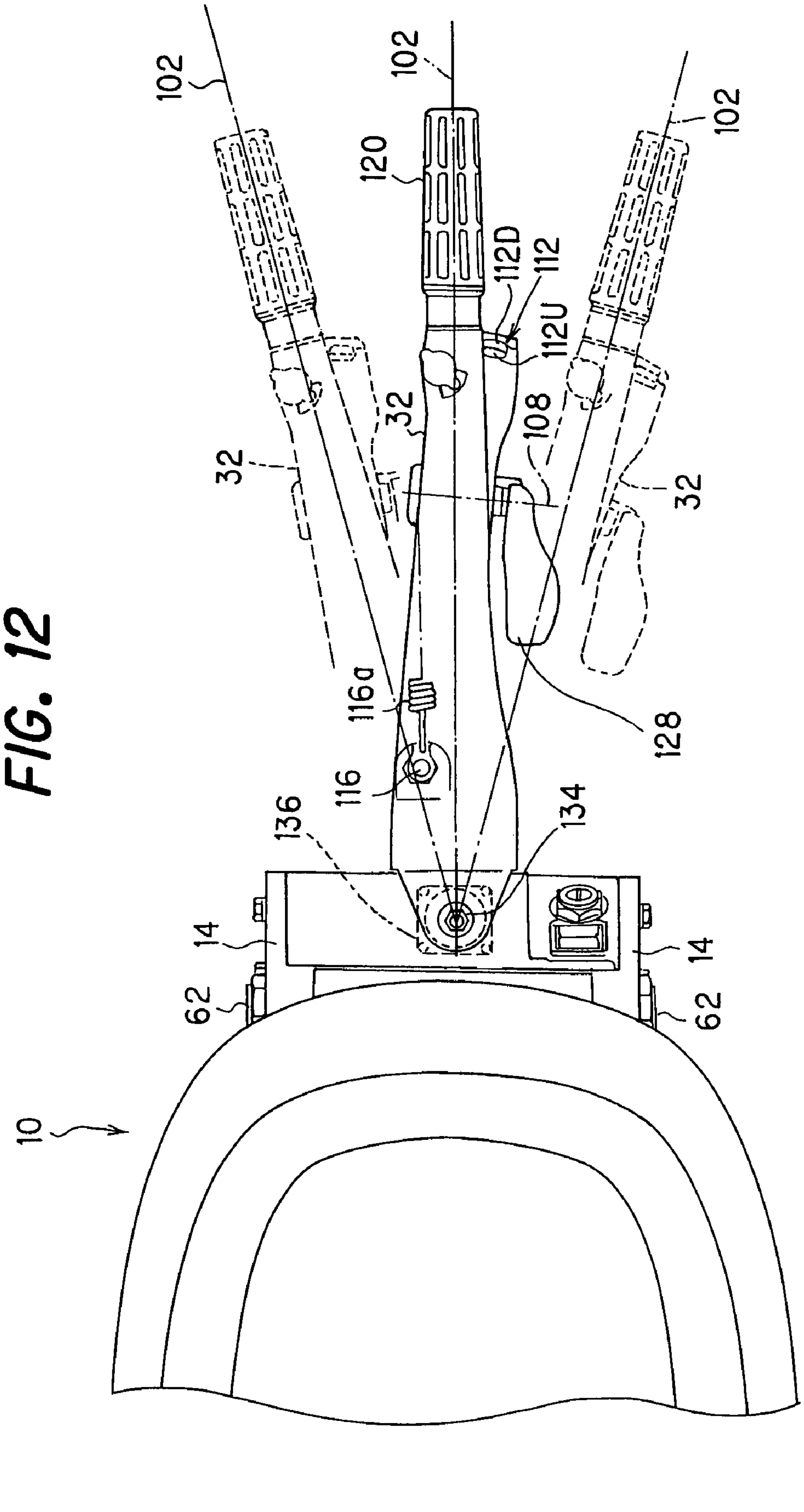
FIG. 12 is an enlarged plan view of portions illustrated in FIG. 11.
Figure 13:
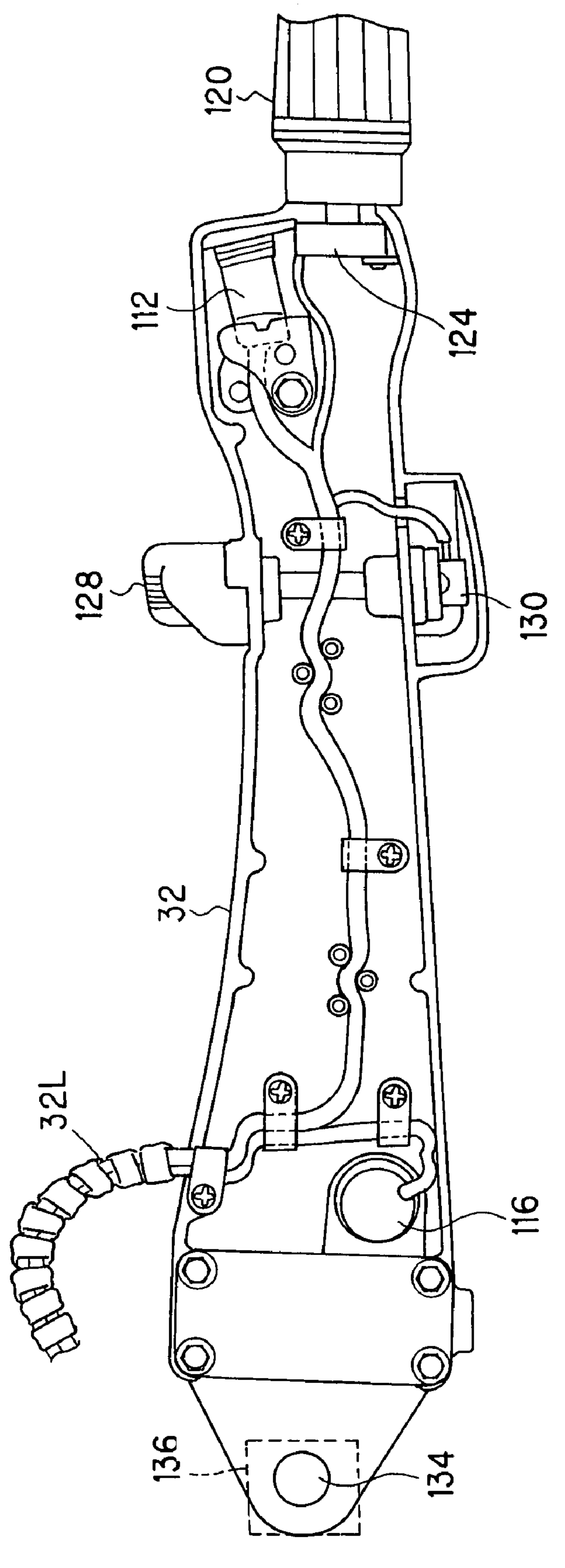
FIG. 13 is a cross-sectional view taken along the line XIII—XIII of FIG. 11.

Then, an outboard motor according to a third embodiment of the invention will be explained with reference to FIGS. 11 to 13, wherein FIG. 11 is a view similar to FIG. 3; FIG. 12 is a plan view of portions illustrated in FIG. 11; and FIG. 13 is a cross-sectional view taken along the line of XIII—XIII of FIG. 11.

As illustrated in the figures, in the outboard motor according to the third embodiment, the bar handle 32 is fastened to the stern brackets 14 in such a manner that it is horizontally turnable or movable about a pivot shaft 134 relative to the stern brackets 14. When turned by the operator in a direction, the bar handle 32 generates a signal indicating that the operator's instruction to steer in that direction, i.e., to operate the electric motor 28 is inputted. In cope with this, a turning angle sensor 136 is added to generate a signal indicative of the angle of turning and the direction in which the bar handle 32 is turned.

Specifically, when the bar handle 32 is turned in a right or left direction, the angle of turning in that direction is detected by the ECU 20 through the output of the turning angle sensor 136 and is sent to the ECU 20 over the signal line 32L. The ECU 20 operates the electric motor 28 based on the sensor output to turn the outboard motor 10 such that the boat 12 is steered in the desired direction.

The bar handle 32 is provided with the throttle grip 120 described in the second embodiment. Although the throttle grip 120 is slightly different from that in the second embodiment in the sense the bar handle 32 is made turnable in the horizontal direction, the throttle grip 120 has a similar function that it generates the instruction to operate the electric motor 44 when rotated. To be more specific, when rotated by the operator, the angle of rotation is detected by the ECU 20 through the output of a rotation angle sensor 124 and the ECU 20 operates the electric motor 44 to regulate the engine speed (i.e. boat running speed) in response to the detected angle of rotation.

The bar handle 32 is also provided with the shift lever 128 described in the second embodiment. When rotated, the angle of rotation is detected by the ECU 20 through the output of the rotation angle sensor 130 and the ECU 20 operates the electric motor 46 based on the output of the rotation angle sensor 130 such that a desired shift (gear change) is achieved.

In the outboard motor according to the third embodiment, thus, the bar handle 32 is fixed to the stern brackets 14 to be horizontally turnable and the angle of turning as well as the direction of turning is detected by the turning angle sensor 136 such that the electric motor 28 is controlled to operate based on the sensor output. With this, the operator can steer the outboard motor 10 in a same manner as that experienced when a conventional bar handle (tiller handle) is used.

The rest of the configuration of the third embodiment as well as the advantages and effects thereof is not different from those of the first and second embodiments.

Figure 14:
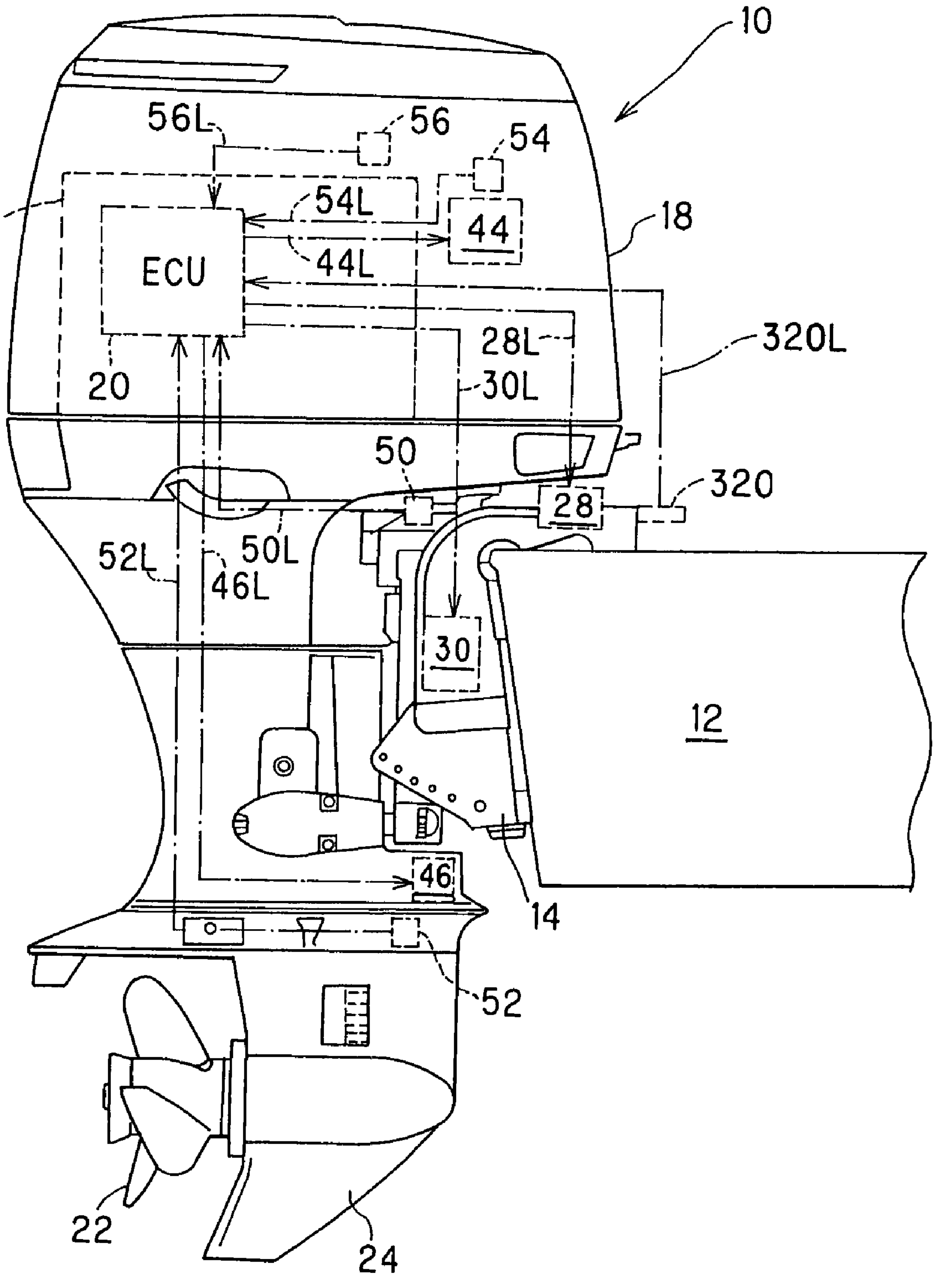
FIG. 14 is a view, similar to FIG. 1, but showing an outboard motor according to a fourth embodiment of the invention.

Then, an outboard motor according to a fourth embodiment of the invention will be explained with reference to FIG. 14.

As shown, in the outboard motor according to the fourth embodiment, the bar handle is removed, and a control panel 320 is installed on the stern brackets 14 at the end closer to the boat 12, on which a group of devices is installed.

Figure 15:
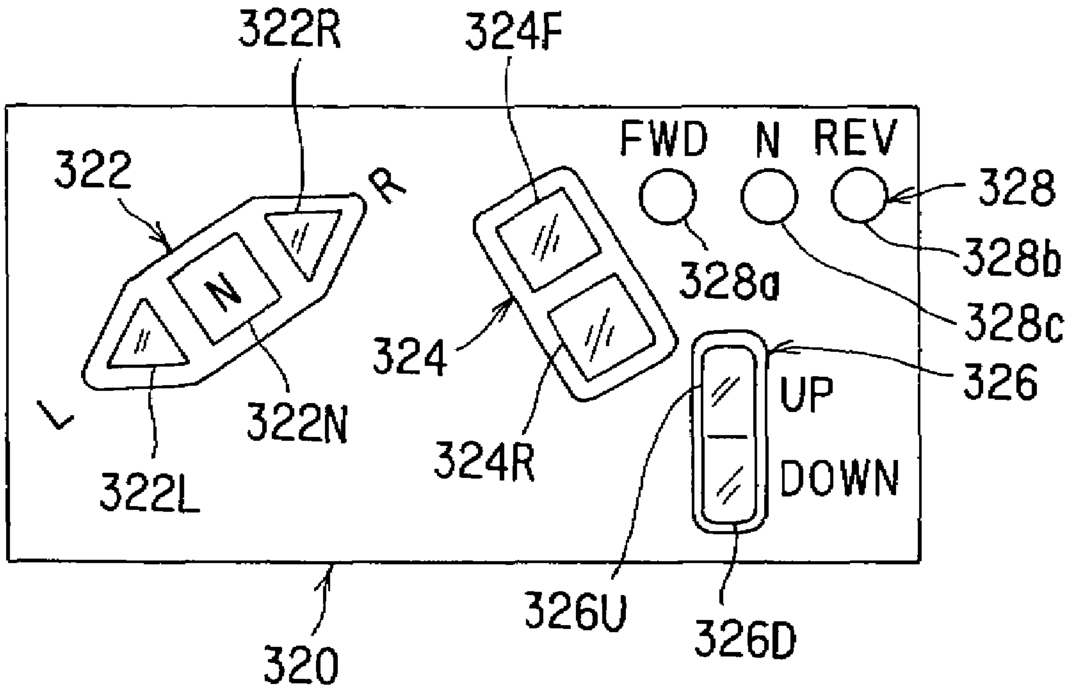
FIG. 15 is an enlarged plan view of a control panel illustrated in FIG. 14.

FIG. 15 is an enlarged plan view of the control panel 320.

As illustrated in the figure, the devices are a steering switch 322 to be used for inputting the instruction to steer, a shift/throttle switch 324 to be used for inputting the instructions to shift (change gear) and to increase/decrease boat running speed, a power-tilt-trim switch 326 to be used for inputting an instruction to regulate the tilt or trim angle of the outboard motor 10, and an indicator 328 that indicates the shift position (gear position, i.e., N, F or R). These devices are connected to the ECU 20 through a signal line 32L. Thus, the group of devices is also installed at a position other than the boat 12.

The steering switch 322 comprises a steer-to-right switch 322R, a steer-to-left switch 322L and a steer-to-neutral switch 322N, respective of which, when made on (pushed) by the operator, generates a signal indicating that the operator's instruction to steer (to operate the electric motor 28) is inputted. Specifically, when the steer-to-right switch 322R is made on, the signal is sent to the ECU 20 over a signal line 320L (not shown in FIG. 15). In response to the signal, the ECU 20 operates the electric motor 28 to turn the swivel shaft 64 and the mount frame 66 left relative to the boat 12 so as to turn the outboard motor 10 in a direction such that the boat 12 is steered right.

When the steer-to-left switch 322L is made on, the ECU 20 operates the electric motor 28 to turn the outboard motor 10 in the opposite direction such that the boat is steered left. When the steer-to-neutral switch 322N is made on, the ECU 20 operates the electric motor 28 to turn the swivel shaft 64 and the mount frame 66 to a position such that the boat 12 is steered in a straight-forwarding direction.

The shift/throttle switch 324 comprises a forward switch 324F and a reverse switch 324R which, when made on (pushed) by the operator, generate a signal indicating that the operator's instruction to shift (change gear) or to increase/decrease boat running speed to steer, i.e., to operate the electric motors 44 and 46 is inputted.

Specifically, if the forward switch 324F is made on when the shift position is neutral, the ECU 20 operates the electric motor 46 such that the clutch 88 engages with the forward gear 86F and in addition, it operates the electric motor 44 such that the throttle opening is increased as a period of time (during which the switch 324F is kept on) increases so as to increase the engine speed (i.e. boat running speed). At the same time, the ECU 20 turns on a first indicator lamp **328*a* among the indicator 328** to indicate that the shift position (gear position) is forward.

On the other hand, if the reverse switch 324R is made on when the shift position is neutral, the ECU 20 operates the electric motor 46 such that the clutch 88 engages with the reverse gear 86R and operates the electric motor 44 such that the throttle opening is similarly increased with increasing switch-pushing-period of time to raise the engine speed (i.e. boat running speed). At the same time, the ECU 20 turns on a second indicator lamp **328*b* among the indicator 328** to indicate that the shift position (gear position) is reverse.

If the reverse switch 324R is made on when the shift position is forward, the ECU 20 operates the electric motor 44 such that the throttle opening is decreased to a low speed around the idling speed and then, it operates the electric motor 46 such that the clutch 88 disengages from the forward gear 86F. If the forward switch 324F is made on when the shift position is reverse, the ECU 20 operates the electric motor 44 in a similar manner such that the throttle opening is decreased to a low speed around the idling speed and then, it operates the electric motor 46 such that the clutch 88 disengages from the reverse gear 86R.

When the clutch 88 is not engaged with the forward gear 86F or the reverse gear 86R, the ECU 20 turns on a third indicator lamp **328*c* among the indicator 328** to indicate that the shift position (gear position) is neutral.

The power-tilt-trim switch 326 comprises an up-switch 326U that generates the signal indicating that the instruction to tilt the outboard motor 10 up is inputted when made on, and a down-switch 326D that generates a signal indicating that the instruction to tilt it down is inputted. The up-switch 326U or the down-switch 326D generates a corresponding signal that is sent to the ECU 20 over the signal line 320L.

When the up-switch 326U is made on by the operator, the ECU 20 operates the two trim hydraulic cylinders **30*b* to extend so as to increase the trim angle such that the boat 12 raises its stem. On the contrary, when the down-switch 326D is made on by the operator, the ECU 20 operates the two trim hydraulic cylinders 30*b* to contract so as to decrease the trim angle such that the boat 12** drops the stem.

If the up-switch 326U is made on when the two trim hydraulic cylinders **30*b* are extended to its maximum, the ECU 20 operates the tilt hydraulic cylinder 30*a* to extend such that the propeller 22 is lifted above the water surface. If the down-switch 326D is made on when the propeller 22 is lifted above the water surface, the ECU 20 operates the tilt hydraulic cylinder 30*a* to contract such that the propeller 22** is lowered under the water surface.

Figure 16:
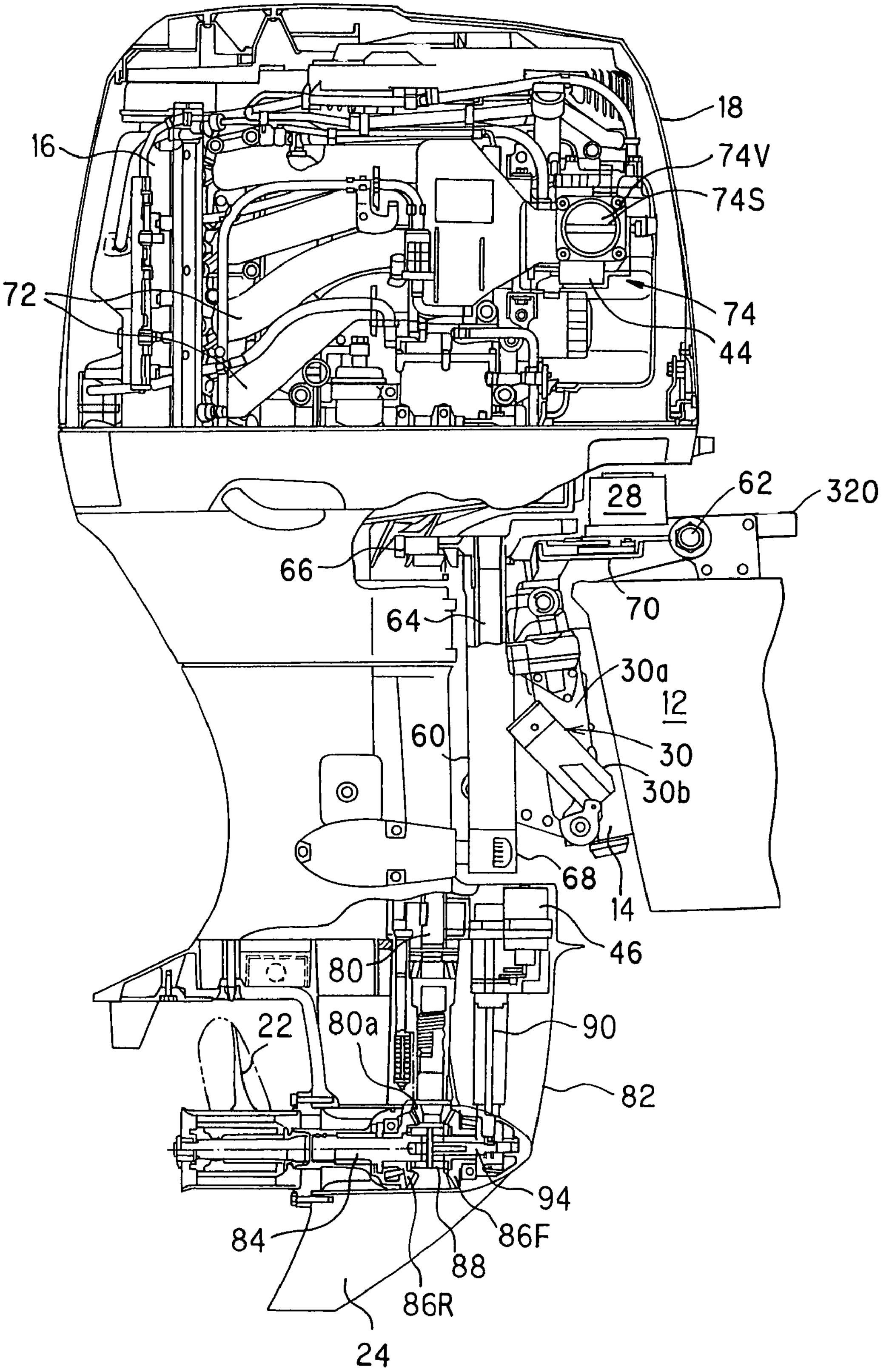
FIG. 16 is a view, similar to FIG. 2, but showing an outboard motor according to the fourth embodiment.
Figure 17:
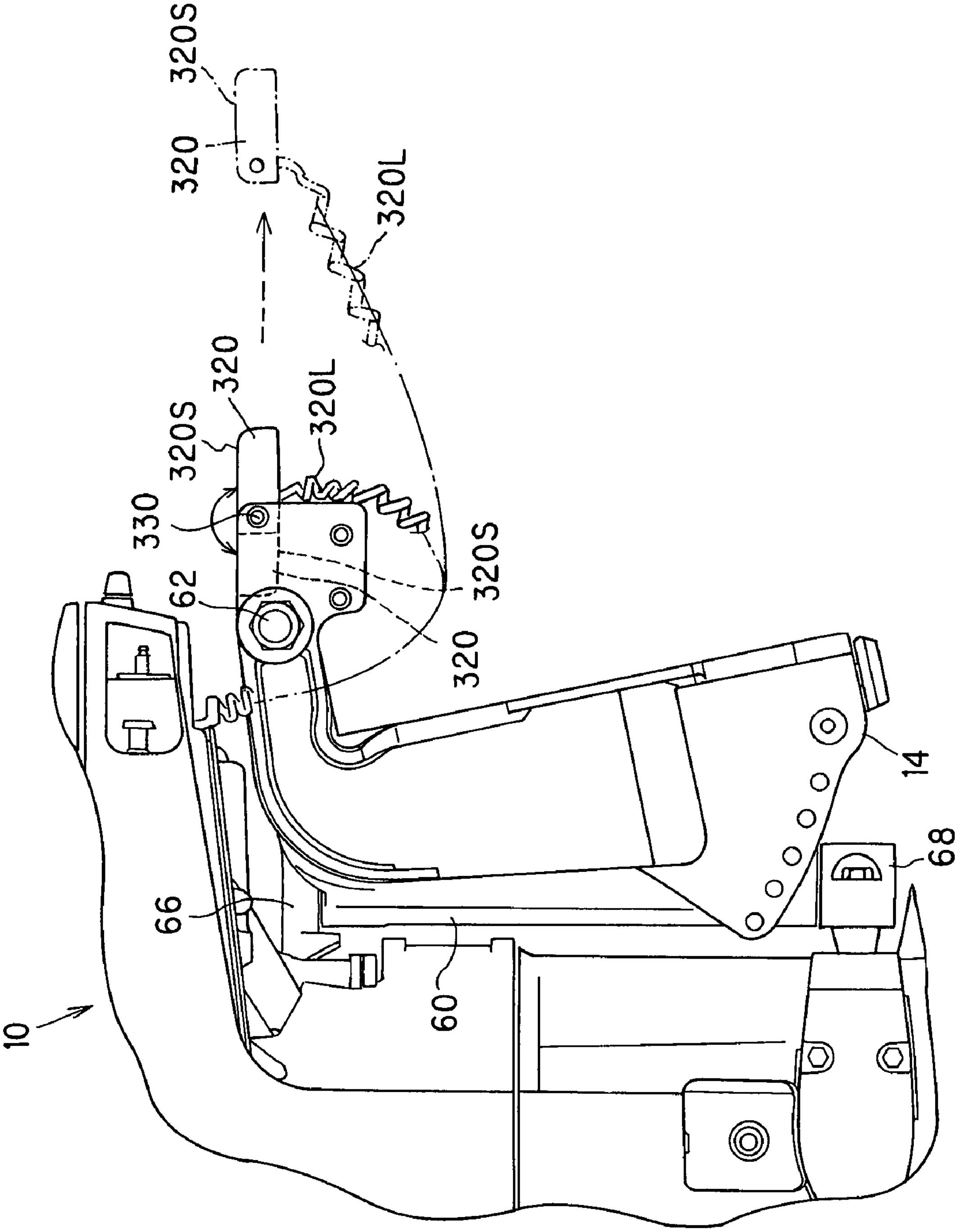
FIG. 17 is a view, similar to FIG. 3, but showing an outboard motor according to the fourth embodiment.
Figure 18:
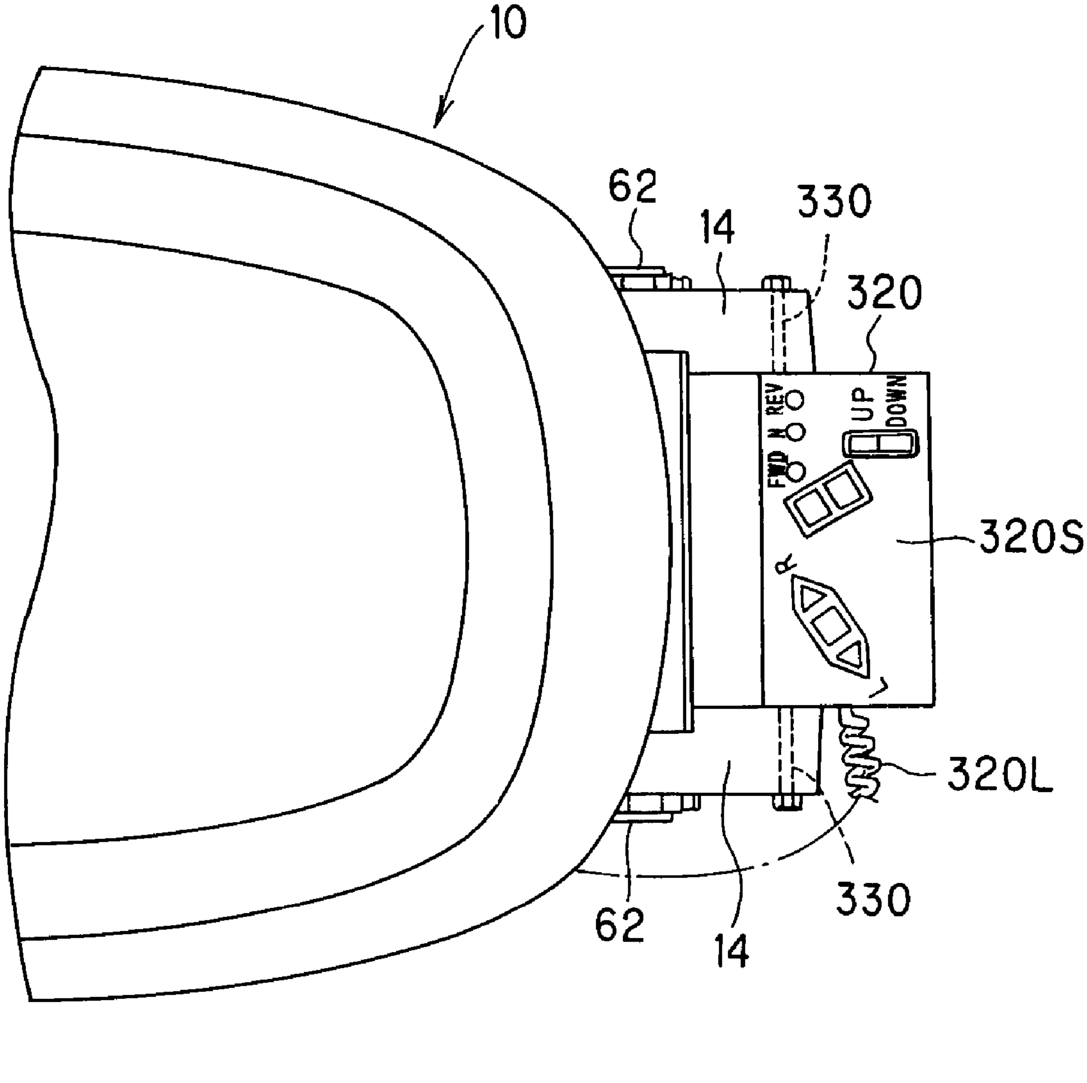
FIG. 18 is a plan view of the outboard motor illustrated in FIG. 17.

The fastening of the control panel 320 to the stern brackets 14 will then be explained with reference to FIGS. 16 to 18, in which FIG. 16 is a view, similar to FIG. 2 and shows outboard motor illustrated in FIG. 14 in partly cross section; FIG. 17 is an enlarged side view of portions around the stern brackets 14; and FIG. 18 is a partial plan view of the outboard motor 10 illustrated in FIG. 17. The electric motor 28, etc., are also omitted from illustration.

As stated above, the control panel 320 is installed on the stern brackets 14, more precisely at its upper portion, at the end closer to the boat 12. Specifically, the control panel 320 is installed on the stern brackets 14 in such a manner that it can be rotated by 180 degrees about a pivot shaft 330. More specifically, the control panel 320 is installed on the stern brackets 14 in such a manner that, if rotated about the pivot shaft 330 from a position (illustrated by dashed lines) to a position (illustrated by solid lines) closer to the boat 12 with its panel surface 320S (on which the switches 322, etc., are provided) up. When the control panel 320 is not used by the operator, if the control panel 320 is upset back to the position illustrated by the dashed lines, it is accommodated in a space defined by the stern brackets 14 with the panel surface 320S down.

In addition, as illustrated by phantom lines, the control panel 320 is made detachable or removable from the stern brackets 14 (more generally from the outboard motor 10), if the operator pulls the pivot shaft 330 out of the position. A signal line 320L connecting the control panel 320 to the ECU 20 is made of a spiral cable and is made extendible.

Having been arranged in the foregoing manner, in the outboard motor according to the fourth embodiment, since the actuators (electric motors) 28, 44 and 46 are provided to power-assist in moving or driving the swivel shaft 64 for steering, the shift rod 90 for shifting, and the throttle valve 74V for regulating boat running speed, this can mitigate the loads to the operator and can improve the operation feel.

Further, since the group of devices (i.e., the steering switch 322, etc.) to be used for inputting the operator's instruction to operate the actuators is installed at a position other than the boat 12, more specifically, are installed at the control panel 320 detachably fastened to the stern brackets 14 which connect the outboard motor 10 to the boat 12, this does not take up a space for the devices at the boat, and this needs no work for installing their cables on the boat, thereby enabling to avoid the problem regarding space utilization and work and to prevent increase in number of components and weight.

Further, since the group of devices is installed on the stern brackets 14 at the position closer to the boat 12, this can further improve the operation feel.

Further, since the control panel 320 can be rotated or upset by 180 degrees about the pivot shaft 330 to a position closer to the boat 12 with its panel surface 320S up, this can further improve the operation feel. On the contrary, when the control panel 320 is not used, the control panel 320 can be upset back to the initial position where it is accommodated in the space defined by the stern brackets 14. This can prevent any switch on the control panel 320 from being pushed unintentionally.

In addition, since the control panel 320 is made detachable from the stern brackets 14 and the signal line 320L connecting the control panel 320 to the ECU 20 is made of a spiral cable that is extendible, the operator can carry the control panel 320 and use it at a desired position on the boat with a desired posture.

Figure 19:
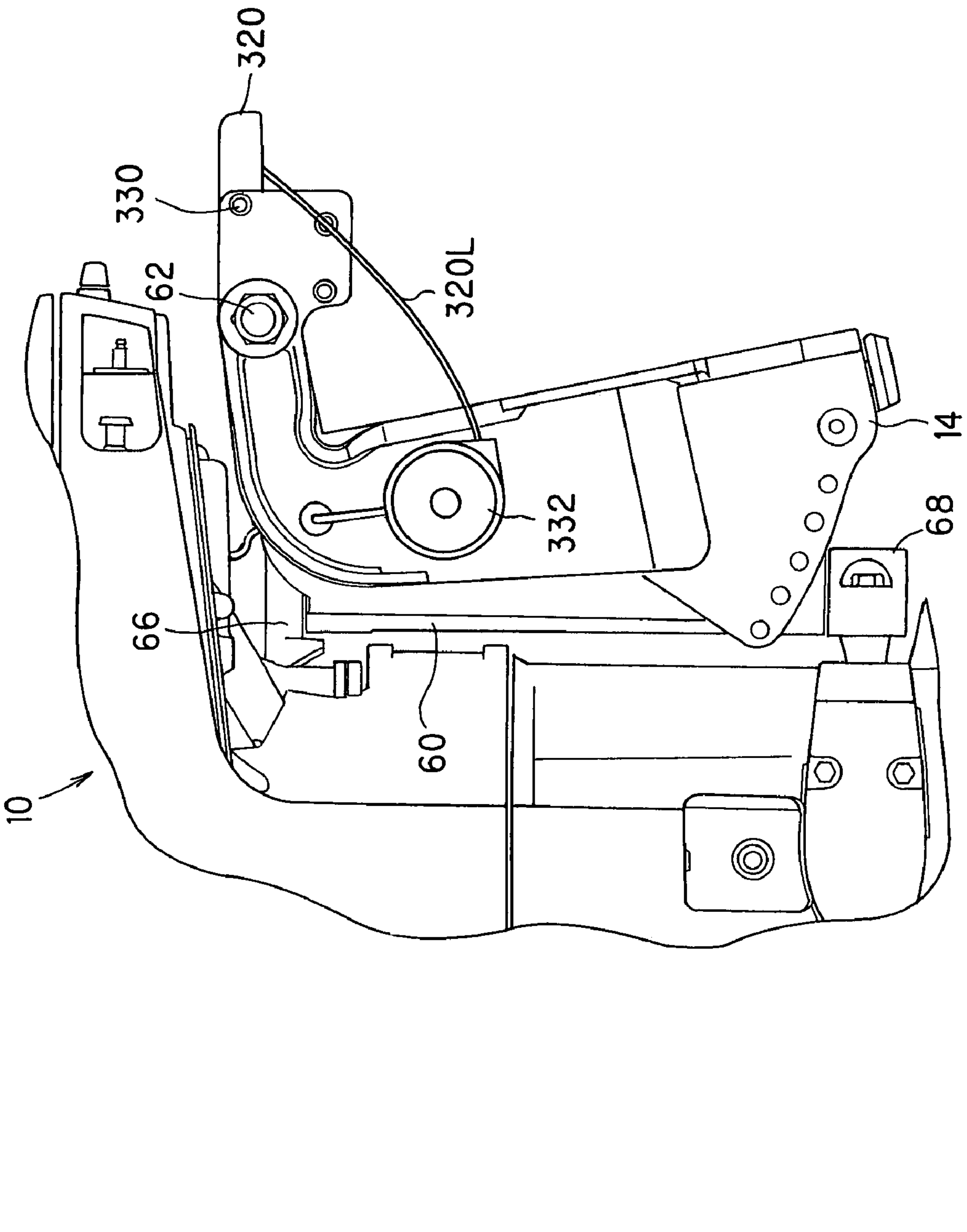
FIG. 19 is a view, similar to FIG. 17, but showing an outboard motor according to a fifth embodiment of the invention.
Figure 20:
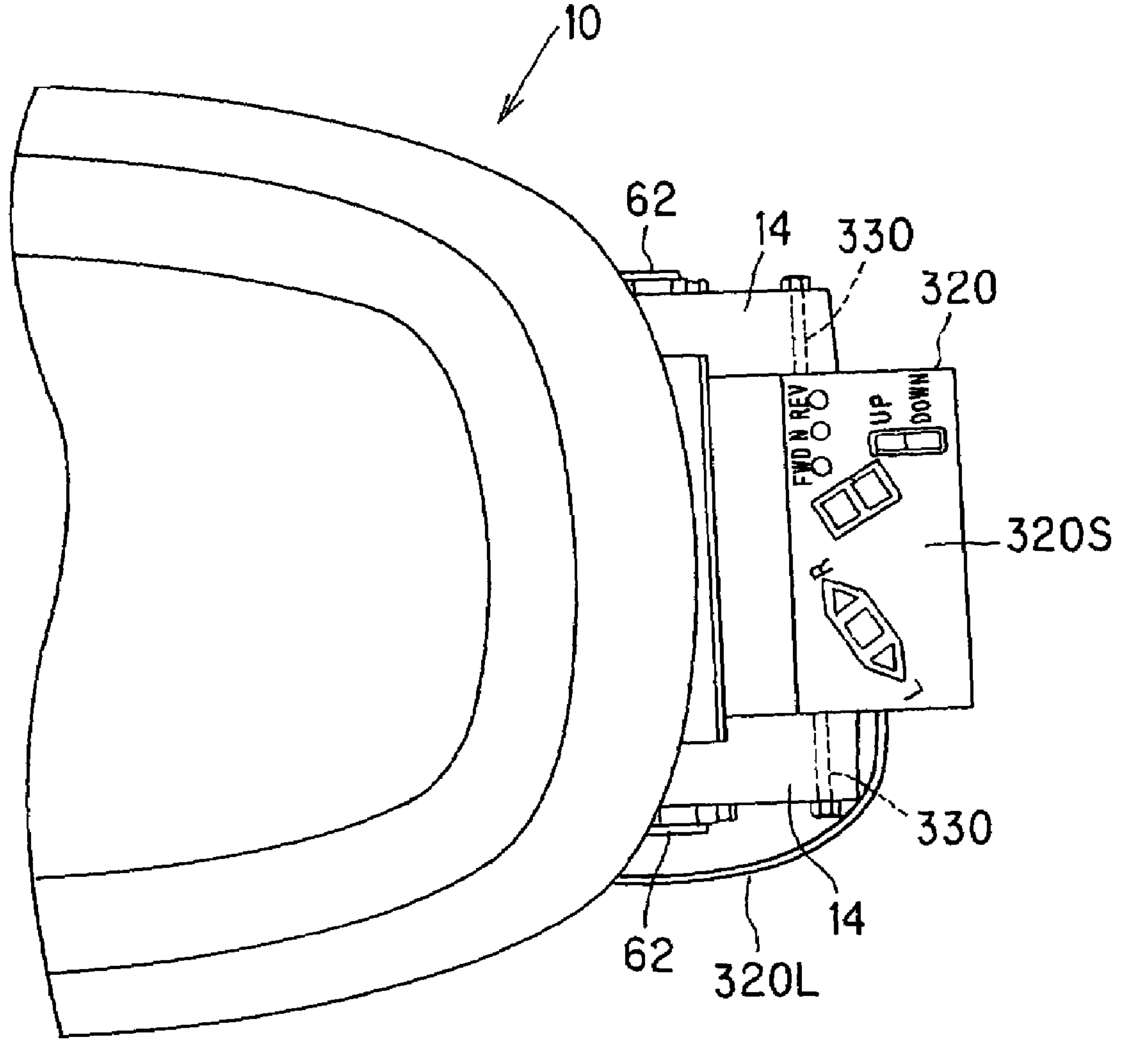
FIG. 20 is a plan view of the outboard motor illustrated in FIG. 19.

Then, an outboard motor according to a fifth embodiment of the invention will be explained with reference to FIGS. 19 to 20, wherein FIG. 19 is a view similar to FIG. 17; and FIG. 20 is a partial plan view of the outboard motor 10 illustrated in FIG. 19.

In the outboard motor according to the fifth embodiment, an ordinary cable or code that is not extendible is used as the signal line 320L, but a reel 332 is provided for winding up and storing the cable. Specifically, the cable (i.e., the signal line 320L) is given a length enough for the operator to freely move on the boat while carrying the control panel 320. When the control panel 320 is not removed from the stern brackets 14 or when the operator uses the control panel 320 near the outboard motor 10, the cable is wound by the reel 332 to be shortened.

With this, the operator can carry and use the control panel at a desired position with a desired posture on the boat 12, without being hampered by the cable.

The rest of the configuration as well as the advantages and effects are the same as that of the fourth embodiment.

Figure 21:
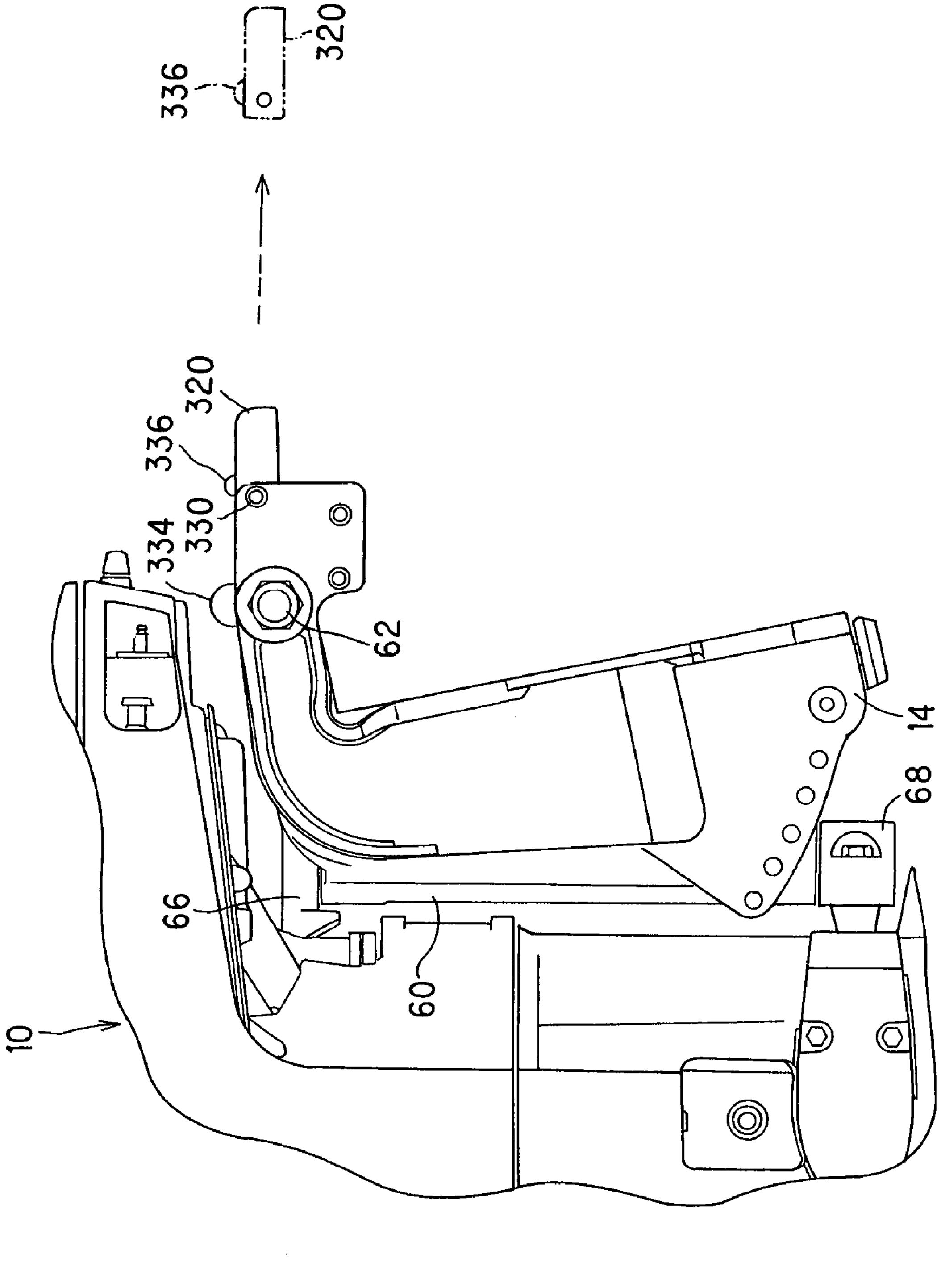
FIG. 21 is a view, similar to FIG. 17, but showing an outboard motor according to a sixth embodiment of the invention.
Figure 22:
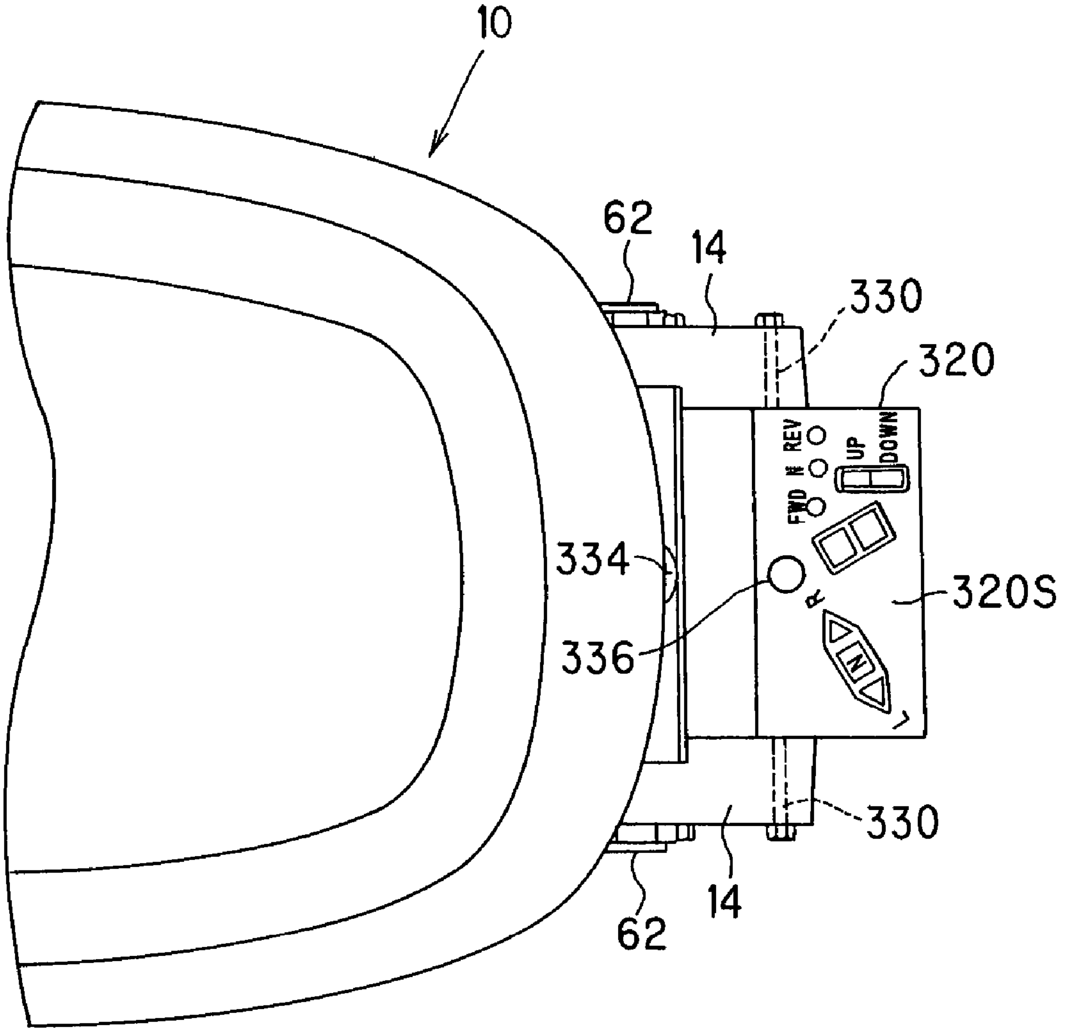
FIG. 22 is a plan view of the outboard motor illustrated in FIG. 21.

Then, an outboard motor according to a sixth embodiment of the invention will be explained with reference to FIGS. 21 to 22, wherein FIG. 21 is a view similar to FIG. 17; and FIG. 22 is a partial plan view of the outboard motor 10 illustrated in FIG. 21.

In the outboard motor according to the sixth embodiment, the signal line 320L (cable) connecting the control panel 320 with the ECU 20 is removed and instead, a first transmitter/receiver 334 is installed on the outboard motor 10 at a position near the tilting shaft 62, while a second transmitter/receiver 336 is installed at the control panel 320, such that the control panel 320 and the ECU 20 is connected by radio. The first transmitter/receiver 334 is connected to the ECU 20 through a cable or cord (not shown).

Specifically, the signals generated by the operator's manual manipulation of the switches 322, 324 and 326 on the control panel 320 are transmitted from the second transmitter/receiver 336 to the first transmitter/receiver 334 through antennas (not shown) and is sent to the ECU 20 through the cable. On the other hand, signals generated by the ECU 20 to turn on any of the indicator lamps **328*a*, 328*b* and 328*c* are transmitted from the first transmitter/receiver 334 to the second transmitter/receiver 336 through antennas (not shown) and the corresponding lamp is lit to indicate the shift position. This can further facilitate the operator to carry and use the control panel at a desired position with a desired posture on the boat 12**, without being hampered by the cable.

The rest of the configuration as well as the advantages and effects are the same as that of the fourth and fifth embodiments.

As mentioned above, the first to six embodiments are configured to provide an outboard motor 10 mounted on a stern of a boat 12 and having an internal combustion engine 16 at its upper portion and a propeller 22 at its lower portion that is powered by the engine to propel the boat, comprising: a throttle actuator (electric motor 44) moving a throttle valve 74V installed at an air intake pipe of the engine for regulating an amount of air to be sucked into the engine to change a boat running speed; a shift actuator (electric motor 46) rotating a shift rod 90 connected to a clutch 88 such that clutch moves from a neutral position to engage with at least one of a forward gear 86F that allows the boat to be propelled in a forward direction and a reverse gear 86R that allows the boat to be propelled in a reverse direction opposite to the forward direction; a steering actuator (electric motor 28) rotating a swivel shaft 64 installed in the outboard motor such that the outboard motor is steered relative to the boat; a group of devices (i.e., steering grip 100, shift/throttle lever 106, power-tilt-trim switch 112, steering switch 322, shift/throttle switch 324, power-tilt-trim switch 326) installed at a position other than the boat and each operable by an operator to generate a signal indicating that an instruction of the operator to operate at least one of the actuators is inputted; and a controller (ECU 20) controlling operation of at least one of the actuators in response to the generated signal.

The group of devices is installed at stern brackets 14 that connects the outboard to the boat. Specifically, the group of devices is installed on a control panel 320 that is installed at the stern brackets. More specifically, the control panel 320 is installed on the stern brackets 14 at an end closer to the boat. The control panel 320 is rotatable from a position where it is accommodated in a space defined by the stern brackets 14 with its panel surface down, to a position closer to the boat with the panel surface up. The control panel 320 is detachable from the stern brackets 14. The control panel 320 is connected to the controller by a cable. The cable is made extendible. There is further provided a reel 332 that winds the cable. Or, the control panel 320 is connected to the controller by radio.

Alternatively, the group of devices is installed at a bar handle 32 connected to the stern brackets 14. Specifically, the bar handle 32 is fastened to the stern brackets 14 in such a manner that a distal end of the bar handle extends towards the boat. More specifically, the group of devices is installed at the bar handle 32 at a location close to the distal end. The bar handle 32 is fixed to the stern brackets 14. Alternatively, the bar handle 32 is connected to the stern brackets to be turnable about a vertical axis. The outboard motor 10 includes; a turning angle sensor 136 generating a signal indicative of an angle of turning of the bar handle; and the controller controls the operation of the steering actuator based on the signal of the turning angle sensor.

It should be noted in the above, although all of the swivel shaft 64, the throttle valve 74V and the shift rod 90 are moved or rotated by the actuators, it is alternatively possible to move or rotate only one or two of the three by the actuator(s).

It should also be noted that, although the electric motors are used as the three actuators, one or all of the actuators may be other than the electric motor, such as a hydraulic cylinder(s).

The entire disclosure of Japanese Patent Application Nos. 2003-019236 and 2003-019237 both filed on Jan. 28, 2003, including specification, claims, drawings and summary, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An outboard motor mounted on a stern of a boat and having an internal combustion engine at its upper portion and a propeller at its lower portion that is powered by the engine to propel the boat, comprising:

- a throttle actuator moving a throttle valve installed at an air intake pipe of the engine for regulating an amount of air to be sucked into the engine to change a boat running speed;
- a shift actuator rotating a shift rod connected to a clutch such that clutch moves from a neutral position to engage with at least one of a forward gear that allows the boat to be propelled in a forward direction and a reverse gear that allows the boat to be propelled in a reverse direction opposite to the forward direction;
- a steering actuator rotating a swivel shaft installed in the outboard motor such that the outboard motor is steered relative to the boat;
- a group of devices installed on a control panel that is installed at stern brackets that connect the outboard motor to the boat and each operable by an operator to generate a signal indicating that an instruction of the operator to operate at least one of the actuators is inputted; and
- a controller controlling operation of at least one of the actuators in response to the generated signal.

2. An outboard motor according to claim 1, wherein the control panel is installed on the stern brackets at an end closer to the boat.

3. An outboard motor according to claim 1, wherein the control panel is rotatable from a position where it is accommodated in a space defined by the stern brackets with its panel surface down, to a position closer to the boat with the panel surface up.

4. An outboard motor according to claim 1, wherein the control panel is detachable from the stern brackets.

5. An outboard motor according to claim 4, wherein the control panel is connected to the controller by a cable.

6. An outboard motor according to claim 5, wherein the cable is made extendible.

7. An outboard motor according to claim 5, further including:

- a reel that winds the cable.

8. An outboard motor according to claim 4, wherein the control panel is connected to the controller by radio.

9. An outboard motor mounted on a stern of a boat and having an internal combustion engine at its upper portion and a propeller at its lower portion that is powered by the engine to propel the boat, comprising:

- a throttle actuator moving a throttle valve installed at an air intake pipe of the engine for regulating an amount of air to be sucked into the engine to change a boat running speed;
- a shift actuator rotating a shift rod connected to a clutch such that clutch moves from a neutral position to engage with at least one of a forward gear that allows the boat to be propelled in a forward direction and a reverse gear that allows the boat to be propelled in a reverse direction opposite to the forward direction;
- a steering actuator rotating a swivel shaft installed in the outboard motor such that the outboard motor is steered relative to the boat;
- a group of devices installed at stern brackets that connect the outboard motor to the boat and each operable by an operator to generate a signal indicating that an instruction of the operator to operate at least one of the actuators is inputted; and
- a controller controlling operation of at least one of the actuators in response to the generated signal; and
- wherein the group of devices is installed at a bar handle connected to the stern brackets.

10. An outboard motor according to claim 9, wherein the bar handle is fastened to the stern brackets in such a manner that a distal end of the bar handle extends towards the boat.

11. An outboard motor according to claim 10, wherein the group of devices is installed at the bar handle at a location close to the distal end.

12. An outboard motor according to claim 10, wherein the bar handle is fixed to the stern brackets.

13. An outboard motor according to claim 10, wherein the bar handle is connected to the stern brackets to be turnable about a vertical axis.

14. An outboard motor according to claim 13, further including;

a turning angle sensor generating a signal indicative of an angle of turning of the bar handle;

and the controller controls the operation of the steering actuator based on the signal of the turning angle sensor.

* * * * *